(12) United States Patent
Sheidler et al.

(10) Patent No.: US 11,498,548 B2
(45) Date of Patent: Nov. 15, 2022

(54) INTELLIGENT HYBRID POWERTRAIN SYSTEMS FOR COMBINE HARVESTERS

(71) Applicant: Deere & Company, Moline, IL (US)

(72) Inventors: Alan D. Sheidler, Moline, IL (US); Padmakar Surwade, Muktainagar (IN); Bhupesh Agrawal, Udaipur (IN)

(73) Assignee: DEERE & COMPANY, Moline, IL (US)

( * ) Notice: Subject to any disclaimer, the term of this patent is extended or adjusted under 35 U.S.C. 154(b) by 73 days.

(21) Appl. No.: 17/201,954

(22) Filed: Mar. 15, 2021

(65) Prior Publication Data

US 2022/0135018 A1 May 5, 2022

(30) Foreign Application Priority Data

Nov. 2, 2020 (IN) .............................. 202041047803

(51) Int. Cl.
*B60W 20/15* (2016.01)
*A01D 41/127* (2006.01)
(Continued)

(52) U.S. Cl.
CPC ......... *B60W 20/15* (2016.01); *A01D 41/1275* (2013.01); *A01D 69/025* (2013.01); *A01D 90/10* (2013.01); *B60W 10/06* (2013.01); *B60W 10/08* (2013.01); *B60W 2300/15* (2013.01); *B60W 2510/06* (2013.01); *B60W 2510/244* (2013.01)

(58) Field of Classification Search
CPC ...... B60W 20/15; B60W 10/06; B60W 10/08; B60W 10/04; B60W 2300/15; A01D 41/1275; A01D 41/127; A01D 41/02; A01D 69/025; A01D 69/02; A01D 90/10
See application file for complete search history.

(56) References Cited

U.S. PATENT DOCUMENTS

| 7,276,806 | B1 | 10/2007 | Sheidler et al. |
| 7,446,426 | B2 | 11/2008 | Sheidler et al. |

(Continued)

FOREIGN PATENT DOCUMENTS

| JP | 2001320805 A | 11/2001 |
| JP | 2004073006 A | 3/2004 |

(Continued)

*Primary Examiner* — George C Jin
(74) *Attorney, Agent, or Firm* — Klintworth & Rozenblat IP LLP

(57) ABSTRACT

Embodiments of an intelligent hybrid powertrain system include an engine, a controller architecture, and an electric drive subsystem having a battery supply and a motor/generator. The controller architecture is configured to: (i) monitor a current state of charge (SoC) of the battery supply when the combine harvester engages in a combine harvest cycle having a tank fill phase and a tank unload phase; (ii) during the tank fill phase, operate the motor/generator to supplement the engine power output and regulate a rate of battery discharge to prevent the current SoC of the battery supply from decreasing below a lower predetermined SoC threshold prior to completion of the tank fill phase; and (iii) during the tank unload phase, operate the motor/generator to charge the battery supply until the current SoC of the battery supply is equal to or greater than a first upper predetermined SoC threshold.

20 Claims, 7 Drawing Sheets

(51) Int. Cl.
*B60W 10/06* (2006.01)
*A01D 69/02* (2006.01)
*A01D 90/10* (2006.01)
*B60W 10/08* (2006.01)

(56) References Cited

U.S. PATENT DOCUMENTS

| | | |
|---|---|---|
| 7,779,616 B2 | 8/2010 | Sheidler et al. |
| 7,788,889 B2 | 9/2010 | Sheidler |
| 7,801,653 B2 | 9/2010 | Sheidler et al. |
| 7,992,370 B2 | 8/2011 | Sheidler et al. |
| 8,087,900 B2 * | 1/2012 | Mackin .................. F02B 73/00 417/212 |
| 8,897,943 B2 | 11/2014 | Sheidler et al. |
| 9,038,759 B2 | 5/2015 | Kaneko et al. |
| 9,067,493 B2 | 6/2015 | Husson et al. |
| 9,254,833 B2 | 2/2016 | Shin et al. |
| 9,637,000 B2 | 5/2017 | Husson et al. |
| 10,773,704 B1 * | 9/2020 | Rollinger .............. B60W 10/06 |
| 2009/0294191 A1 * | 12/2009 | Sheidler ................ B60W 20/13 180/65.265 |
| 2018/0177133 A1 * | 6/2018 | Heyne ............. B60W 30/18054 |

FOREIGN PATENT DOCUMENTS

| | | |
|---|---|---|
| JP | 2011045324 A | 3/2011 |
| JP | 2011067155 A | 4/2011 |
| JP | 2012055223 A | 3/2012 |
| JP | 2013070642 A | 4/2013 |
| JP | 2013070644 A | 4/2013 |

* cited by examiner

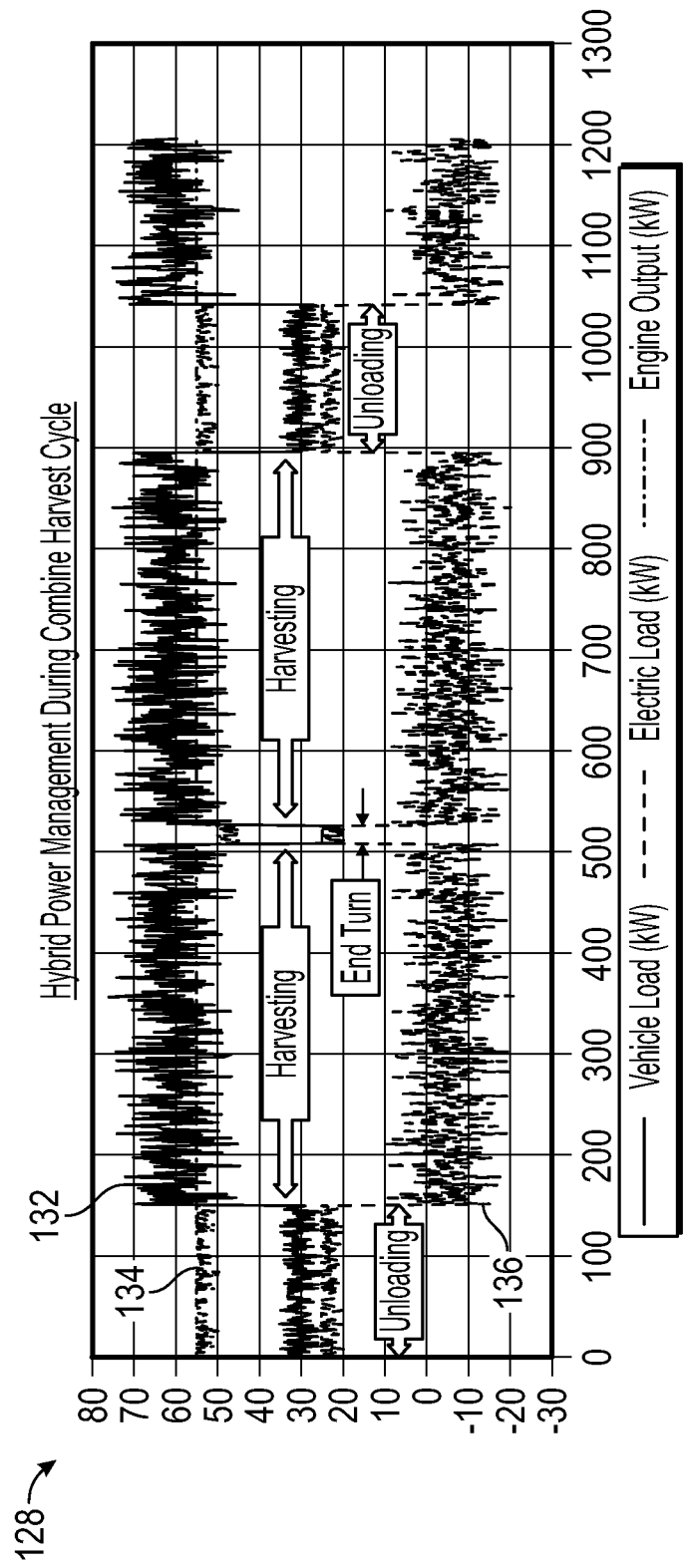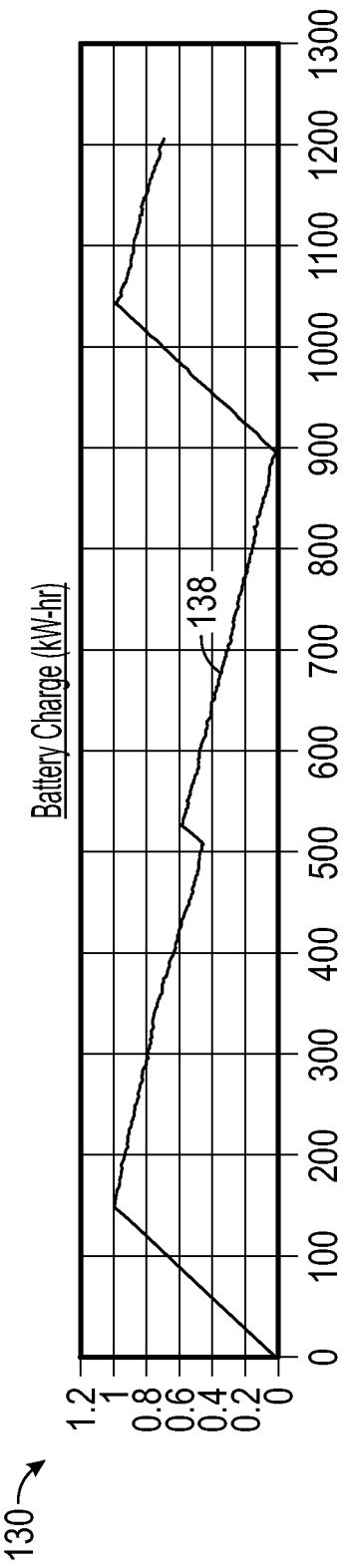
FIG. 4
FIG. 5

INTELLIGENT HYBRID POWERTRAIN SYSTEMS FOR COMBINE HARVESTERS

CROSS-REFERENCE TO RELATED APPLICATION(S)

This application claims priority under 35 U.S.C. § 119(a) to India application Ser. No. 2020/41047803, filed Nov. 2, 2020.

STATEMENT OF FEDERALLY SPONSORED RESEARCH OR DEVELOPMENT

Not applicable.

FIELD OF THE DISCLOSURE

This disclosure relates to intelligent hybrid powertrain systems optimizing various aspects of combine harvester performance, while enabling internal combustion engine downsizing.

BACKGROUND OF THE DISCLOSURE

Combine harvesters (also referred to as "agricultural combines") have greatly improved the efficiency with which corn, canola, soybeans, wheat, oats, paddy, sunflowers, and other crops are harvested, threshed, cleaned, and collected for distribution to consumers. Generally, combine harvesters are relatively complex, self-propelled machines capable of harvesting large swathes of crop plants as the harvester travels over a crop field, while separating unbroken grain from broken grain and material other than grain (MOG). After cleaning, harvested grain is delivered into a grain tank, typically by conveyance through a clean grain elevator. When the grain tank fills, the harvested grain is then unloaded from the combine harvester via an unloading auger. Specifically, the combine harvester may unload grain to a grain transport vehicle, such as grain cart or wagon towed by a tractor, while the combine harvester is stationary (static unloading) or while the combine harvester continues active harvesting (unloading "on-the-go"). This process of repeatedly filling and unloading the grain tank is referred to herein as the "combine harvest cycle." Propulsion, grain unloading, and the various crop material processing functions of a combine harvester are typically powered utilizing a single internal combustion engine, such as a heavy duty diesel engine, onboard the combine harvester. Generally, the combine harvester engine is sized to provide sufficient power output capabilities to accommodate relatively heavy or demanding engine loading conditions, which may be periodically encountered when ingesting and processing relatively dense (high yield) crops, when harvesting uphill, and during on-the-go unloading of the combine harvester.

SUMMARY OF THE DISCLOSURE

Intelligent hybrid powertrain systems for usage onboard combine harvesters are disclosed. Embodiments of the intelligent hybrid powertrain system include an engine configured to generate an engine power output utilized to power propulsion and grain tank unloading functions of the combine harvester, a controller architecture, and an electric drive subsystem. The electric drive subsystem includes, in turn, a battery supply and a motor/generator, which is configured to be selectively powered by the battery supply to supplement the engine power output or powered by the engine to charge the battery supply. Coupled to battery supply and the engine, the controller architecture is configured to: (i) monitor a current state of charge (SoC) of the battery supply when the combine harvester engages in a combine harvest cycle having a tank fill phase and a tank unload phase; (ii) during the tank fill phase, operate the motor/generator to supplement the engine power output and regulate a rate of battery discharge to prevent the current SoC of the battery supply from decreasing below a lower predetermined SoC threshold prior to completion of the tank fill phase; and (iii) during the tank unload phase, operate the motor/generator to charge the battery supply until the current SoC of the battery supply is equal to or greater than a first upper predetermined SoC threshold enabling the combine harvest cycle to repeat.

In further embodiments, the intelligent hybrid powertrain system includes an engine configured to generate an engine power output utilized to power propulsion and grain tank unloading functions of the combine harvester, onboard sensors configured to provide data indicative of a fill level of the grain tank, and an electric drive subsystem having a battery supply and a motor/generator powered by the battery supply to supplement the engine power output or powered by the engine to charge the battery supply. A controller architecture is coupled to the onboard sensors and to the electric drive subsystem. The controller architecture is configured to: (i) monitor a current state of charge (SoC) of the battery supply when the combine harvester engages in a combine harvest cycle having a tank fill phase and a tank unload phase; (ii) during the tank fill phase, operate the motor/generator to supplement the engine power output and regulate a rate of discharge of the battery supply to maintain the current SoC at or above a dynamic SoC floor having a value varying in conjunction with a current fill level of the grain tank; and (iii) during the tank unload phase, operate the motor/generator to charge the battery supply.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures:

FIGS. 4 and 5 are graphs illustrating an example hybrid power management scheme suitably applied by the controller architecture of the intelligent hybrid powertrain system (FIGS. 1 and 2) in selectively switching the electric drive subsystem between power assist and rapid recharge modes;

Figure 1:
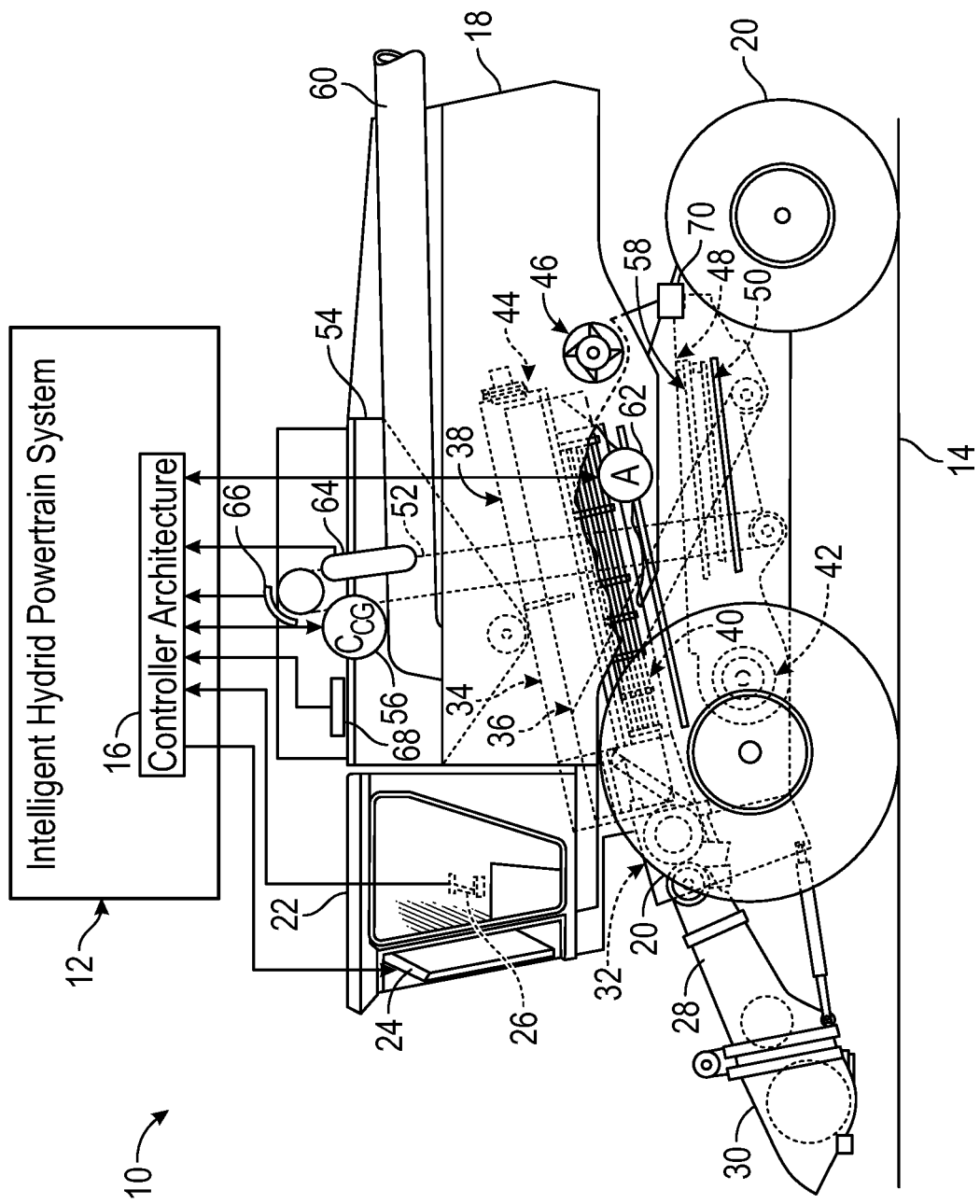
FIG. 1 is a schematic of a combine harvester equipped with the intelligent hybrid powertrain system, as illustrated in accordance with an example embodiment.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as setforth the appended claims.

Overview

As noted above, modern combine harvesters are commonly equipped with heavy duty diesel engines or other internal combustion engines, which are sized to accommodate peak engine load demands periodically encountered during combine harvester operation. For example, depending upon the overall size and capabilities of a combine harvester, a modern mid-size combine harvester may be equipped with diesel engine having maximum rated power output capabilities exceeding 74 kilowatts (kW). While modern diesel engines may be equipped with various systems for reducing emissions (e.g., exhaust gas recirculation systems) and boosting engine output power (e.g., turbocharging modules), inefficiencies result when a relatively large internal combustion engine is operated at sub-optimal power output levels during most phases of combine harvester operation, including across combine harvest cycles during which a combine harvester performs actions to collect grain in a grain tank (herein, the "tank fill phase") and then unloads the grain held in the grain tank, when full, to a grain cart or other grain transport vessel (herein, the "tank unload phase"). More generally, fuel efficiency levels and emissions tend to worsen as the size and maximum rated power output of a combine harvester's internal combustion engine increases. While it is possible to simply downsize a diesel engine (or other internal combustion engine) deployed onboard a particular combine harvester to achieve greater fuel efficiencies, save weight and cost, and reduce emissions, the usage of a smaller diesel engine risks inadequate power output availability during periods of heavy engine loading, which can result in stall conditions and other negative outcomes detracting from overall harvesting efficiency and customer satisfaction levels.

Hybrid powertrain systems offer the potential of enabling downsizing of internal combustion engines (engines) onboard combine harvesters. In particular, through the incorporation of an electric machine (e-machine) capable of operating as an electric motor, the mechanical power output (shaft speed and torque) of the e-machine may supplement the power output of the engine by summing these mechanical power outputs through a suitable drivetrain arrangement. The e-machine may be selectively driven utilizing a suitable battery source or supply (e.g., a battery pack including a number of interconnected battery cells) contained in an electric drive subsystem. The e-machine may be specifically referred to as a "motor/generator" when also capable of being back-driven by the engine to generate electricity, which may then be utilized to charge the battery supply when possessing a rechargeable chemistry, such as a lithium ion chemistry or a nickel-cobalt-aluminum (NCA) chemistry. A processing sub-system or "controller architecture," which may be comprised of any number of individual controllers (e.g., an engine control unit, a power management control unit, and a motor/generator control unit) may operate the motor/generator to supplement the engine power output and regulate a rate of battery discharge under certain conditions, such as during the tank fill phase of a combine harvest cycle. For ease of reference, this action is referred to herein as placing the electric drive system in a "power assist mode." Conversely, the controller architecture may operate the motor/generator to charge the battery supply under other conditions, such as during the tank fill phase of the combine harvest cycle. This is referred to herein as placing the electric drive system in a "rapid charge mode."

Embodiments of the present disclosure leverage the ability of such an electric drive subsystem to introduce levels of intelligence in strategically switching between operational modes of the electric drive subsystem, as well as in controlling the behavior of the electric drive subsystem when placed in a particular mode during combine harvester operation. For this reason, embodiments of the present disclosure are generally referred to as "intelligent hybrid powertrain systems." Embodiments of the intelligent hybrid powertrain system include an electric drive subsystem, which contains a rechargeable battery supply and an e-machine in the form of a motor/generator. As alluded to above, the electric drive subsystem is operable in (i) a power assist mode in which the motor/generator is driven via rechargeable battery supply to supplement a power output provided by the engine (e.g., a heavy duty diesel engine) of the combine harvester, and (ii) a rapid charge mode in which the motor/generator is backdriven by the engine to charge the rechargeable battery supply. As indicated by the descriptor "rapid" in the term "rapid charge mode," the rate of battery recharge in the rapid charge mode ($R_{RECHARGE}$) will typically exceed the rate of battery discharge in the power assist mode ($R_{DISCHARGE}$) For example, in certain embodiments, $R_{DISCHARGE}$ may have a controlled variable value (e.g., as varied by the controller architecture in accordance with the below-described torque curves), while $R_{RECHARGE}$ may have a substantially constant value that is at least twice an absolute maximum value of $R_{DISCHARGE}$.

The controller architecture is further operably coupled to various components of the electric drive subsystem and determines when to place the electric drive subsystem mode in the power assist mode, the rapid change mode, and potentially other modes of operation, such as a quiescent or standby mode of operation. In certain implementations, for example, the controller architecture monitors a current state of charge (SoC) of the battery supply when the combine harvester engages in a combine harvest cycle having a tank fill phase and a tank unload phase; operates the motor/ generator to supplement the engine power output during the tank fill phase of a combine harvest cycle; and further operates the motor/generator to charge the battery supply during the tank unload phase of the combine harvest cycle. Further, during the tank fill phase, the controller architecture may operate the motor/generator to supplement the engine power output, while regulate a rate of battery discharge to prevent the current SoC of the battery supply from falling below a lower predetermined SoC threshold prior to completion of the tank fill phase. Comparatively, during the tank unload phase, the controller architecture may operate the motor/generator to charge the battery supply until the current SoC of the battery supply is equal to or greater than a first upper predetermined SoC threshold enabling the combine harvest cycle to repeat. The tank unload phase may be conducted during "low power unloading" of the combine harvester. The term "low power unloading," as appearing herein, referring to unloading of bulk grain from the grain tank of a combine harvester, while the combine harvester remains stationary (static unloading) or while the combine harvester travels at a slow rate of speed significantly less than a typical ground speed of the combine harvester when engaged in active harvesting; e.g., a ground speed of less than one mile per hour (mph).

By virtue of the hybrid power management scheme above, embodiments of the intelligent hybrid powertrain system enable the combine harvester engine downsizing to provide enhancements in fuel economy, lowered emissions, cost savings, and other benefits. Concurrently, power limitation concerns are addressed through the strategic application of the power assist mode during the tank fill phase of the combine harvest cycle of the combine harvester; and, specifically, by discharging the rechargeable battery supply at a controlled (variable or non-variable) rate to drive the motor/generator and supplement the power output of the engine during the tank fill phase of the combine harvest cycle. Further, the rate at which the rechargeable battery supply discharges during the tank fill phase is controlled to ensure adequate power supply through each grain tank filling phase; that is, over the time period during which the combine harvester ingests and processes sufficient crop material to fill or substantially fill the grain tank with bulk grain, readying the combine harvester for the tank unload phase. Subsequently, during the tank unload phase (e.g., conducted when the combine harvester is stationary or otherwise has a ground speed less than 1 mph), the controller architecture transitions the electric drive subsystem into operation in the rapid charge mode (that is, operates the motor/generator to charge the battery supply) to exploit the relatively low power output demands of the combine harvester (vehicle load) and rapidly recharge the rechargeable battery supply to a level sufficient to repeat the above-described process or cycle. Calculations demonstrate that the battery supply may be rapidly recharged to a sufficient level over the relatively brief unloading period (often on the order of approximately two minutes) to allow this power management cycle to repeat in an essentially indefinitely manner. Further, although the rechargeable battery supply is discharged at a slower rate during the tank fill phase of the combine harvest cycle, sufficient electric power can be supplied to the motor/generator to provide an adequate power assist level enabling an appreciable reduction in combine engine size, as further described below in connection with FIGS. 4 and 5.

As another benefit to the above-described hybrid power management scheme, the duration of time in which the engine of a combine harvester operates in a higher, optimized speed range is extended for further improvements in engine performance, fuel economy, and emissions reduction. Consider, for example, a conventional, non-hybrid powertrain deployed onboard a combine harvester and including an oversized (high power output) diesel engine. In the majority of customer use applications, such an oversized engine typically operates well below its peak power output capabilities during the majority of active harvesting scenarios and even more so during low power (e.g., static) unloading of the combine. Comparatively, through the usage of a smaller primary internal combustion engine, embodiments of the intelligent hybrid powertrain system enable operation of the engine at higher efficiency power output levels closer to the maximum rated power output of the engine and at over an increasingly optimize shaft speed range. Further, during low power unloading of the combine harvester (corresponding to the tank unload phase of the combine harvest cycle), the engine shaft output speed of the engine may be maintained at a relatively high, optimized level by further loading the engine to back-drive the motor/generator and support the above-described rapid charge functionality. Such an intelligent hybrid power management scheme consequently not only enables downsizing of the combine engine, but further optimizes engine efficiency by reducing variances in the engine shaft output speed and trending the shaft output speed toward an optimal speed range across the hybrid combine power management cycle in at least some embodiments of the present disclosure.

When deployed onboard a combine harvester, the intelligent hybrid powertrain system may further be leveraged to help minimize or reduce (colloquially, "smooth-out") pronounced transient variations in engine loading conditions. In such implementations, the controller architecture of the intelligent hybrid powertrain system may monitor for temporary spikes or lulls in the engine loading conditions by, for example, monitoring the output shaft speed of the engine and/or any additional sensor inputs indicative of the current load placed on the engine. When detecting a heavy transient loading condition during which the engine is placed under an increased load exceeding an upper engine load threshold (e.g., due to uphill travel, blockage clearing, or a temporary increase in the density or consistency of the ingested crop material), the controller architecture may increase the level at which the electric drive subsystem supplements the engine power output until the heavy transient loading condition passes. Conversely, when detecting a light transient loading conditions during which the engine is temporarily placed under a reduce load less than a lower engine load threshold (e.g., due to downhill travel or a temporarily interruption in the flow of crop material ingested into the combine harvester during the combine harvest cycle), the controller architecture temporarily places the electric drive subsystem in the rapid charge mode. While this example hybrid power management scheme is reactive in nature, it is also possible for aspects of the hybrid power management scheme to be proactive in transitioning between the rapid charge and power assist modes of operation. For example, when anticipating a transitory increase in the load placed on the engine (e.g., due to initial rotational startup of the separator drum or rotor in response to operator input commands), the controller architecture may also temporarily place the electric drive subsystem in the power assist mode (e.g., concurrent with or slightly before activation of the separator rotor) to supplement the engine power output until the heavy transient loading condition passes.

In further embodiments of the intelligent hybrid powertrain system, and in a manner similar to that just described, the controller architecture may operate the motor/generator or otherwise control the electric drive subsystem to promote (better maintain) rotation of the engine output shaft within an optimized quasi-isochronous range. Such an optimized speed range of the engine output shaft may be bounded by a lower speed threshold and an upper speed threshold, which are stored in a computer-readable memory accessible to the controller architecture. In such embodiments, the controller architecture may place the electric drive subsystem in the rapid charge mode when the rotational speed of the engine output shaft increases above the upper speed threshold during the combine harvest cycle; and further place the electric drive subsystem in the power assist mode when the rotational speed of the engine output shaft falls below the lower speed threshold. Again, by enabling the engine output shaft of the engine to rotate over an increasingly optimized, consistent speed range during combine harvester operation, or otherwise utilizing the electric drive subsystem to provide load leveling of the combine engine, engine performance and efficiency is boosted, while emissions are reduced.

Embodiments of the intelligent hybrid powertrain system may carry-out still further functions to optimize battery storage characteristics, particularly given that rechargeable battery supplies commonly possess an optimal state of charge (SoC) range less than the full storage capacity of the battery supply. Accordingly, in embodiments, the controller architecture of the intelligent hybrid powertrain system may be configured to monitor a current SoC of the rechargeable battery supply during combine harvester operation and perform at least one of the following actions: (i) deter further charging of the rechargeable battery supply when the current SoC of the rechargeable battery supply reaches a second predetermined threshold (e.g., maximum optimal SoC threshold) greater than the above-described first predetermined threshold, as stored in a memory of the intelligent hybrid powertrain system accessible to the controller architecture; and (ii) deter further discharge of the rechargeable battery supply when the current SoC of the rechargeable battery supply reaches a lower threshold value (e.g., minimum optimal SoC threshold), as further stored in the memory. As appearing herein, reference to "deterring" further charge or discharge of the battery supply denotes that additional charging or discharging of the battery supply is wholly prevented or at least significantly slowed as compared to typical charging of the battery supply when the electric drive subsystem is placed in the rapid charge mode or typical discharge of the battery supply when the electric drive subsystem is placed in the power assist mode. Notably, in certain embodiments, the electric drive subsystem may be equipped with an energy dissipation mechanism (e.g., resistors converting electrical energy to waste heat), which is electrically coupled between the motor/generator and the rechargeable battery supply and which can be selectively activated by the controller architecture to enable motor/generator braking of the engine output shaft (e.g., to support the above-described isochronous assist mode), while preventing or at least minimizing charging of the rechargeable battery supply when the current SoC of the battery supply approaches or exceeds the maximum optimal SoC threshold.

In other implementations of the present disclosure, the controller architecture may further execute other charging and discharging control schemes to enhance hybrid power management and the overall performance of the intelligent hybrid powertrain system. For example, in embodiments, the intelligent hybrid powertrain system may include a memory in which a plurality of torque curves is stored, with each torque curve associated with a different SoC range of the rechargeable battery supply. During operation of the intelligent combine powertrain system, the controller architecture monitors a current SoC of the rechargeable battery supply, and varies the power output of the motor/generator in accordance with a selected one of the plurality of torque curves corresponding to the current SoC of the rechargeable battery supply. Specifically, in the latter regard, the controller architecture may vary the power output of the motor/generator such that the summation of the power output of the motor/generator and the power output of the engine is substantially equally to a torque target for a current rotational speed of the engine output shaft, as indicated by the selected torque curve. In so doing, the controller architecture may better preserve or management the SoC of the rechargeable battery supply, while generating a total power output following torque curves or profiles familiar to combine operators.

Embodiments of the intelligent hybrid powertrain system may apply still further hybrid power management techniques in addition to or in lieu of the other processes and functions described above. For example, in instances in which battery discharge is permitted outside of the tank fill phase of the combine harvester, embodiments of the intelligent hybrid powertrain system may take certain protective measures to ensure that sufficient energy reserves are maintained in the rechargeable battery supply to power the motor/generator fully through a given tank fill phase of the combine harvest cycle. This may be accomplished, in at least some instances, utilizing a dynamic SoC floor approach. In this regard, during operation of the intelligent hybrid powertrain system, the controller architecture may adjust a position of the dynamic SoC floor based upon a current fill level of the grain tank, as monitored by the controller architecture utilizing suitable sensors onboard the combine harvester; e.g., load cells contained in the grain tank of the combine harvester and/or a mass flow rate sensor. The controller architecture also monitors the current SoC of the rechargeable battery supply; and, when the current SoC of the rechargeable battery supply reaches (or nears) the dynamic SoC floor in its present position, the controller architecture deters (prevents or significantly slows) further discharge of the rechargeable battery supply. In so doing, the controller architecture ensures sufficient battery power reserves are maintained to provide the desired power assistance through the tank fill phase of the combine harvest cycle; and noting that, when the grain tank of the combine harvester is filled with bulk grain, the dynamic SoC floor may be equivalent to the above-described minimum optimal SoC threshold. Additional description of an example dynamic SoC floor approach for enhanced SoC management is described below in connection with FIG. 6.

The following will now describe examples of the intelligent hybrid powertrain system in the context of an example combine harvester, as illustrated and discussed below in connection with FIG. 1. Additionally, methods or processes that may be carried-out by the controller architecture of the intelligent hybrid powertrain system to perform the various tasks or processes described herein are set-forth below in connection with FIGS. 2-7. Lastly, examples of graphics that may be selectively generated on a display device located in the cabin of a combine harvester to visually apprise a combine harvester operator of certain operating parameters of the intelligent hybrid powertrain system (e.g., a current SoC of the rechargeable battery supply, an instantaneous engine power output, the present operative mode of the electric drive subsystem, and so on) are described below in connection with FIGS. 8 and 9. The following description is provided by way of non-limiting illustration only and should not be construed to unduly restrict the scope of the appended Claims in any manner.

Example Combine Harvester Equipped with Intelligent Hybrid Powertrain System Referring to FIG. 1, an example combine harvester 10 equipped with an intelligent hybrid powertrain system 12 is schematically depicted. The combine harvester 10 is presented by way of illustration to establish a non-limiting example context in which embodiments of the intelligent hybrid powertrain system 12 may be better understood. In further embodiments, the combine harvester 10 may assume other forms and may include different combinations of components suitable for processing crop plants ingested into the harvester 10 when traveling over a field 14. Further, only selected components of the intelligent hybrid powertrain system 12, such as a controller architecture 16, are shown in FIG. 1 for illustrative clarity. Further illustration and discussion of the example intelligent hybrid powertrain system 12, and operation of the hybrid powertrain system 12, is provided below in connection with FIGS. 2-9.

The example combine harvester 10 includes a chassis body or main frame 18, which is supported by a number of ground-engaging wheels 20. The ground-engaging wheels 20 are powered by a non-illustrated engine and drivetrain including, for example, an electronically-controlled hydraulic transmission. Atop a forward portion of the main frame 18, a cabin 22 encloses an operator station including an operator's seat (not shown), at least one display device 24, and an operator interface 26. A feederhouse 28 is mounted to a forward portion of the main frame 18 of the combine harvester 10 at an elevation generally below the cabin 22. Various harvesting heads or, more simply, "headers" are attachable to the feederhouse 28 in an interchangeable manner to, for example, allow customization of the combine harvester 10 for harvesting a particular crop types. An example of one such header, here a harvesting platform 30, is shown in FIG. 1.

As the combine harvester 10 travels over the field 14 in a forward direction, the harvesting platform 30 gathers severed crop plants into the feederhouse 28, which then consolidates the severed crop plants for conveyance (e.g., via a non-illustrated conveyor belt contained in the feederhouse 28) into the interior of the combine harvester 10. Within the combine harvester 10, the crop plants are engaged by a rotating drum conveyor or "beater" 32, which directs the crop plants in a generally upward direction into a rotary threshing and separating section 34. The rotary threshing and separating section 34 can include various components for performing the desired functions of separating the grain and chaff from other plant material. The illustrated rotary threshing and separating section 34, for example, includes a drum or threshing rotor 36 having threshing features and rotatably mounted in a case or rotor housing 38. Rotation of the threshing drum 36 within the rotor housing 38 causes both grain and chaff to fall through the separation grates of a concave 40 and into the inlet of a lower grain cleaning section 42. Concurrently, straw and similar MOG is directed toward an outlet end 44 of the rotary threshing and separating section 34 and is ultimately delivered to another rotating drum or "discharge beater" 46 for expulsion from an aft end of the combine harvester 10.

Discussing now the grain cleaning section 42 in greater detail, this section of the combine harvester 10 includes various components adapted to clean the newly-harvested grain, while separating the chaff therefrom. Such components may include a chaffer 48, a sieve 50, and any number of fans (not shown). By action of the grain cleaning section 42, the newly-cleaned grain is directed into a clean grain elevator 52 for conveyance upwardly into a storage reservoir or grain tank 54 of the combine harvester 10. At least one camera 56 is positioned to capture imagery of the grain transported along the bulk grain stream. Specifically, in embodiments and as indicated in FIG. 1, the camera 56 may be positioned adjacent the clean grain elevator 52 to capture imagery of the bulk grain transported via the elevator 52 into the grain tank 54. As the clean grain elevator 52 transports the newly-harvested grain into the grain tank 54, tailings fall onto a return elevator 58 extending across a lower portion of the clean grain elevator 52. The return elevator 58 then recycles the tailings back to the inlet of the threshing drum 36 for further threshing to allow the above-described grain processing steps to repeat and maximize the grain yield of the combine harvester 10.

In the above-described manner, the combine harvester 10 effectively intakes severed crop plants from the field 14, extracts grain from the crop plants, cleans the newly-extracted grain, and then stores the grain in grain tank 54 for subsequent unloading utilizing, for example, an unloading auger 60. Also, during usage of the combine harvester 10, certain components within the combine harvester 10 may be positionally adjusted or the operating parameters of such components may be modified utilizing any number of actuators 62, such as hydraulic- or electrically-controlled linear or rotary actuators, one of which is generically represented by symbol 62 in FIG. 1. In this regard, the operational speeds of any number of fans or conveyor belts may be varied, as may the position of any number of non-illustrated deflectors, chaffer components, sieve components, or the like. Such actuators 62 may be controlled in response to operator input received via the operator interface 26 located within the cabin 22, controlled via command signals issued by the controller architecture 16 included in the intelligent hybrid powertrain system 12, or otherwise commanded by another controller or control unit onboard the combine harvester 10.

The operator interface 26 located within the cabin 22 can be any device or group of devices utilized by an operator to input commands into or otherwise control the intelligent hybrid powertrain system 12. In various implementations, the operator interface 26 may be integrated into or otherwise associated with the display device 24. In this regard, the operator interface 26 may include physical inputs (e.g. buttons, switches, dials, or the like) located on or proximate the display device 24, a touchscreen module integrated into the display device 24, or a cursor input device (e.g., a joystick, trackball, or mouse) for positioning a cursor utilized to interface with GUI elements generated on the display device 24. Comparatively, the display device 24 can be any image-generating device configured for operation within the cabin 22 of the combine harvester 10. The display device 24 may be affixed to the static structure of the cabin 22 and realized in a head-down display (HDD) configuration in embodiments. The combine harvester 10 contains various other sensors in addition to those mentioned above, which may supply data to the controller architecture 16 during operation of the intelligent hybrid powertrain system 12. A non-exhaustive list of such additional sensors may include a grain moisture sensor 64 for providing capacitance measurements indicative of bulk density, a mass flow sensor 66 (e.g., a strike plate), and one or more load cells 68 located in the grain tank (e.g., for weighing the stored grain and calibrating the mass flow sensor). The combine harvester 10 may also include sensors for measuring grain loss, such as one or more shoe loss sensors 70 (e.g., strike sensors) and/or non-illustrated (e.g., strike) sensors positioned at the separators, in embodiments.

Figure 2:
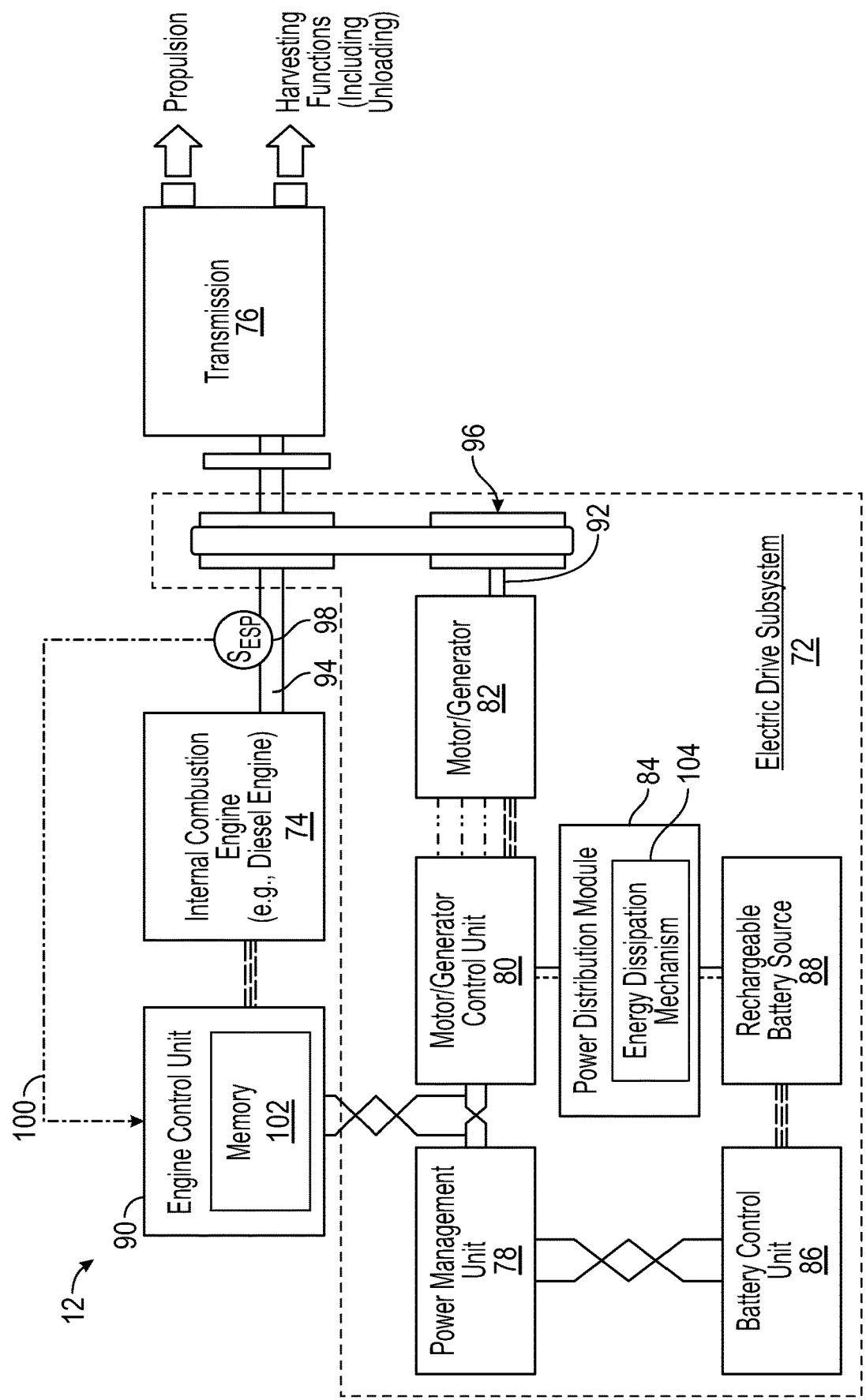
FIG. 2 schematically illustrates an example embodiment of the intelligent hybrid powertrain system in greater detail and including, among other components, an engine, an electric drive subsystem, and processing components collectively forming a processing subsystem or controller architecture.

Referring now to FIG. 2, the intelligent hybrid powertrain system 12 is schematically depicted in greater detail. The intelligent hybrid powertrain system 12 further includes an electric drive subsystem 72, an engine 74, and a transmission 76. The electric drive subsystem 72 includes, in turn, a power management unit 78, a motor/generator (M/G) control unit 80, an e-machine in the form of a motor/generator 82, a power distribution module 84, a battery control unit 86, and a rechargeable battery source or supply 88. Various lines in FIG. 2 illustrate electrical connections between these components, as well as an engine control unit (ECU) 90 further contained in the intelligent hybrid powertrain system 12. The motor/generator 82 also includes an M/G output shaft 92, which is mechanically coupled to an engine output shaft 94 of the engine 74 via a suitable arrangement (here, a belt drive 96) enabling the respective mechanical power outputs of the engine 74 and motor/generator 82 to be summed, as applied to the transmission 76, when electric drive system 72 operates in the power assist mode; and further enabling motor/generator 82 to be back-driven by the engine 74 when the electric drive system 72 operates in the rapid charge mode. Various other components may be included in the intelligent hybrid powertrain system 12, such as various onboard sensors including those previously described and a sensor 98 for monitoring a rotational rate of the output shaft. ECU 90 receives data from the sensor 98 over a wired or wireless data connection 100, and possibly other data from onboard sensors indicative of a current power output of engine 74, as appropriate to carry-out the functions described below.

Controller architecture 16 shown in FIG. 1 thus corresponds to ECU 90 shown in FIG. 2 and may also include various other processing or controller elements included in the intelligent hybrid powertrain system 12, such the power management unit 78, the M/G control unit 80, and the battery control unit 86 contained in the electric drive subsystem. Generally, then, the controller architecture 16 of the intelligent hybrid powertrain system 12 can assume any form suitable for performing the functions described throughout this document. The term "controller," as appearing herein, is utilized in a non-limiting sense to generally refer to the processing architecture of intelligent hybrid powertrain system 12. The controller architecture 16 can encompass or may be associated with any practical number of processors, control computers, computer-readable memories, power supplies, storage devices, interface cards, and other standardized components. The controller architecture 16 may also include or cooperate with any number of firmware and software programs or computer-readable instructions designed to carry-out the various process tasks, calculations, and control/display functions described herein. Such computer-readable instructions may be stored within a non-volatile sector of the memory 102. While generically illustrated in FIG. 2 as a single block, the memory 102 can encompass any number and type of storage media suitable for storing computer-readable code or instructions, as well as other data utilized to support the operation of the intelligent hybrid powertrain system 12. The memory 102 may be integrated into the controller architecture 16 in embodiments as, for example, a system-in-package, a system-on-a-chip, or another type of microelectronic package or module.

During operation of the combine harvester 10 (FIG. 1), engine 74 generates mechanical power utilized to drive propulsion and harvesting (including unloading) functions of the combine harvester 10 through the transmission 76. This includes motion of various components included in the above-described feederhouse 28, rotary threshing and separating section 34, and grain cleaning section 42. The ECU 90 regulates various functions of the engine 74 to govern its power output. The actuated devices utilized by the ECU 90 (and, more generally, the engine control system) to vary the engine power output differ between engine platforms, but generally include one or more devices controlling the amount of fuel and oxygen (as determined by air volume, density, and temperature) delivered to the engine's combustion chambers per combustion cycle. In accordance with embodiments of the present disclosure ECU 90 further cooperates, via bidirectional signal communication, with the various controller units within the electric drive subsystem 72 (e.g., power management unit 78 and battery control unit 86) and the power distribution module 84 to collectively form the controller architecture 16, which performs the functions described herein; e.g., those functions performed in carrying-out example hybrid power management process 106 described below in connection with FIG. 3. In certain embodiments, the ECU 90 (and, more generally, the controller architecture 16) may selectively active and deactivate an energy dissipation mechanism 104 included in the electric drive system 72; e.g., as schematically indicated in FIG. 2, energy dissipation mechanism 104 (when provided) may be electrically coupled between the motor/generator 82 and the rechargeable battery supply 88 and, perhaps, integrated into the power distribution module 84. When activated, the energy dissipation mechanism 104 dissipates electrical energy generated by the motor/generator 82 (e.g., by passage through a bank of resistors converting some fraction of the electrical energy to heat) prior to delivery of such energy to the rechargeable battery supply 88. Thus, the provision of energy dissipation mechanism 104 may enable the motor/generator 82 to provide a braking function when desired, while deterring (preventing or minimizing) recharging of the rechargeable battery supply 88.

M/G control unit 80 and battery control unit 86 provides the appropriate integration functions facilitating control of the motor/generator 82 and the battery control unit 86, respectively, by the ECU 90. The power management unit 78 similarly communicates with ECU 90 and helps coordinate the control functions of the M/G control unit 80 and battery control unit 86. The power distribution module 84 routes electrical power to motor/generator 82 from the appropriate cells within the rechargeable battery supply 88 when the electric drive subsystem 72 operates in the power assist mode; and further routes electrical power, as generated by back-driving of the motor/generator 82, to the various cells within the rechargeable battery supply 88 from when the electric drive subsystem 72 operates in the rapid charge mode. Any combination of the power distribution module 84, the power management unit 78, the M/G control unit 80, and the battery control unit 86 may cooperate with the ECU 90 to perform the functions set-forth in the example hybrid power management process 106 described below. In alternative embodiments, various other components may be included in the electric drive subsystem 72, or any number of the illustrated components may be omitted, providing the intelligent hybrid powertrain system 12 is capable of performing at least a subset of the novel functions described herein.

Figure 3:
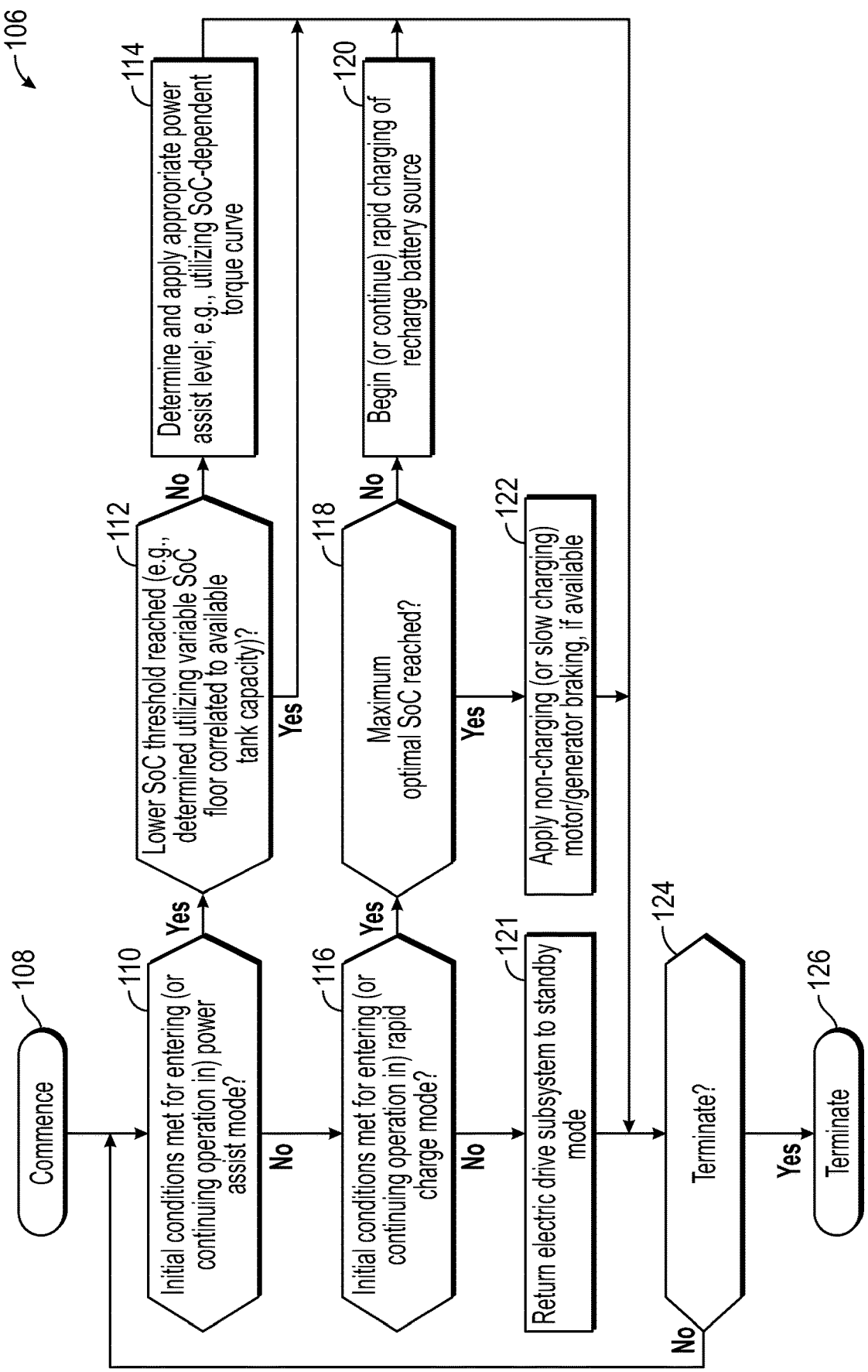
FIG. 3 is a flowchart of an example process suitably carried-out by the controller architecture of the intelligent hybrid powertrain system (FIGS. 1 and 2) to actively switch the electric drive subsystem between different modes of operation.

Turning next to FIG. 3, there is shown a hybrid power management process 106 suitably carried-out by the controller architecture 16 (FIG. 1) in intelligently switching the electric drive subsystem 72 between a power assist mode and a rapid charge mode, perhaps in addition to other operative modes, such as quiescent (standby) mode. The hybrid power management process 106 includes a number of process STEPS 108, 110, 112, 114, 116, 118, 120, 121, 122, 124, 126 each of which is described, in turn, below. Depending upon the particular manner in which the hybrid power management process 106 is implemented, each step generically illustrated in FIG. 3 may entail a single process or multiple sub-processes. Further, the steps illustrated in FIG. 3 and described below are provided by way of non-limiting example only. In alternative embodiments of the hybrid power management process 106, additional process steps may be performed, certain steps may be omitted, and/or the illustrated process steps may be performed in alternative sequences.

The controller architecture 16 of the intelligent hybrid powertrain system 12 commences performance of the hybrid power management process 106 at STEP 108 in response to the occurrence of a predetermined trigger event. Generally, the hybrid power management process 106 may be triggered or initiated in response to startup of the combine harvester 10 or, perhaps, other events indicating that the combine harvester 10 is likely to engage in active harvesting in a near term timeframe. Further, in certain cases, an operator may be permitted to activate and deactivate (or customize) the hybrid power management process 106 through interaction with a settings page or screen accessible utilizing a graphic user interface (GUI) generated on the display device 24 located in the combine harvester cabin 22.

After commencing the hybrid power management process 106 (STEP 108), the controller architecture 16 advances to STEP 110. During STEP 110, the controller architecture 16 determines whether to place the electric drive subsystem 72 in the power assist mode or continue operation in the power assist mode if presently active. The controller architecture 16 may determine whether to place the electric drive subsystem 72 in the power assist mode utilizing a reactive approach (based upon onboard sensor data), utilizing a proactive approach (in anticipation of increased engine loading), or utilizing both approaches. For example, in various embodiments, the controller architecture 16 places the electric drive subsystem 72 in the power assist mode (and thus operates the motor/generator to supplement the engine power output) when determining that the combine harvester 10 is presently engaged in active harvesting during the tank fill phase of a combine harvest cycle; and switches the electric drive subsystem 72 into the rapid charge mode when the combine harvester 10 transitions to low power unloading of grain from the grain tank 54 (thus operating the motor/generator to charge the battery supply) during the tank unload phase of the combine harvest cycle. Accordingly, in such embodiments, the controller architecture 16 may determine that it is likely appropriate to place the electric drive subsystem 72 in the power assist mode during STEP 110 when establishing the combine harvester 10 is engaged in active harvesting based upon operator input and/or sensor inputs of the combine harvester 10; and, when so determining, advance to STEP 112 of the hybrid power management process 106.

Additionally or alternatively, the controller architecture 16 may determine that the electric drive subsystem 72 may be appropriately placed in the power assist mode when a heavy transient loading condition is detected (or is predicted to occur imminently) during which the engine 74 is placed under a significantly increased load exceeding an upper engine load threshold during the combine harvest cycle; e.g., due to uphill travel of the combine harvester 10, due to ingestion of dense or wet crop material, due to combine travel through muddy terrain, or for another reason. Similarly, if an event generally necessitating a high transient power output from the powertrain system 12 is occurring presently or is predicted to occurring imminently (e.g., due to input commands entered via the operator interface 26), the controller architecture 16 may determine that the electric drive subsystem 72 is properly placed in the power assist mode (or at least the initial conditions for placing the electric drive subsystem 72 in the power assist mode have been satisfied) and advance to STEP 112 of the hybrid power management process 106. As an example in this latter regard, the controller architecture 16 may determine when initial startup of the separator drum or rotor occurs during operation of the combine harvester 10; and, when so determining, may advance to STEP 112 to potentially place the electric drive subsystem 72 in the power assist mode, as further described below. In still other implementations in which the intelligent hybrid powertrain system 12 assists in maintaining the engine shaft speed within an optimized, generally isochronous range having a minimum threshold value and a maximum threshold value, the controller architecture 16 may advance to STEP 112 to potentially place the electric drive subsystem 72 in the power assist mode to increase the engine output shaft speed when decreasing below the minimum threshold value, as reported by the speed rate sensor 98.

During STEP 112 of the example process 106, the controller architecture 16 further determines whether a minimum SoC threshold has been reached at the present juncture in time. In certain embodiments, the minimum SoC threshold can be static value above which the SoC of the rechargeable battery supply 88 is desirably maintained to ensure optimal operation of the electric drive system 72. In other instances, the minimum SoC threshold can be variable or dynamic value representing a dynamic SoC floor, which is adjusted based upon the current fill level of the grain tank 54 of the combine harvester 10, as described below in connection with FIG. 7. If determining that the minimum SoC threshold has been reached during STEP 112, the controller architecture 16 advances to STEP 124 and determines whether the current iteration of the hybrid power management process 106 should terminate, as described below. Otherwise, the controller architecture 16 progresses to STEP 114 of the hybrid power management process 106; ascertains a target power assist level or output at which the motor/generator 82 should operate; and then controls the electric drive subsystem 72 (by adjusting the current supplied to or voltage applied across the motor/generator 82) to achieve the target power output of the motor/generator 82. In certain embodiments, the motor/generator 82 may be energized or otherwise controlled to generate a substantially constant mechanical power output when the electric drive subsystem 72 is placed in the power assist mode. More usefully, however, the controller architecture 16 may command the motor/generator 82 to generate a variable power output, which varies depending upon a current rotational rate of the engine output shaft 94 in accordance with a pre-established torque and, perhaps, a particular torque curve selected from a plurality of stored torque curves based upon the current SoC of the rechargeable battery supply 88, as further discussed below in connection with FIG. 6. Afterwards, the controller architecture 16 advances to STEP 124 and determines whether the current iteration of the hybrid power management process 106 should terminate.

If instead determining that the electric drive system 72 should not be placed in the power assist mode during STEP 110 of the example process 106, the controller architecture 16 continues onto STEP 116 and determines whether the electric drive system 72 should instead be placed in the rapid charge mode (or a non-charging motor/generator braking mode, available). In manner similar to that previously described, the controller architecture 16 may determine whether to place the electric drive subsystem 72 in the power assist mode utilizing a reactive approach (based upon onboard sensor data), utilizing a proactive approach (in anticipation of decreased engine loading), or utilizing a combination of such approaches. In various implementations, the controller architecture 16 places the electric drive subsystem 72 in the rapid charge mode when the combine harvester 10 engages in low power unloading of grain from the grain tank 54. Accordingly, in such embodiments, the controller architecture 16 may initially determine that it is appropriate or proper to place the electric drive subsystem 72 in the rapid charge mode during STEP 110 when the combine harvester 10 is engaged in low power unloading of grain from the grain tank 54. When determining that the combine harvester 10 is presently engaged in lower power (e.g., static) unloading of grain from the grain tank 54 between tank fill phases of the hybrid combine power management cycle, the controller architecture 16 advances to STEP 118 and determines whether a maximum optimal SoC threshold has been reached. Additionally, in embodiments, the controller architecture 16 may automatically place the electric drive subsystem 72 in the rapid charge mode when the combine harvester 10 engages in non-harvesting turning between active turning passes, as further described below in connection with FIGS. 5 and 6.

In still further implementations of the intelligent hybrid powertrain system 12, the controller architecture 16 may determine that the electric drive subsystem 72 is potentially appropriately placed in the rapid charge mode when a light transient loading condition is detected by onboard sensor data (or when a light transient loading condition is predicted to occur imminently) during which the engine 74 is placed under an appreciably reduced load falling below a lower engine load threshold during the combine harvest cycle; e.g., due to downhill travel of the combine harvester 10, ingestion of low density crop material, a temporary interruption in the flow of crop material through the machinery of the combine harvester 10, or for another reason. Similarly, if a condition or event generally necessitating a high transient power output from the powertrain is presently underway or is predicted to occur imminently (e.g., due to input commands entered via the operator interface 26), the controller architecture 16 may determine that it is tentatively proper to place the electric drive subsystem 72 in the power assist mode and advance to STEP 110 of the hybrid power management process 106. As an example in this latter regard, the controller architecture 16 may determine when initial startup of the separator rotor occurs during operation of the combine harvester 10; and, when so determining, may advance to STEP 112 to potentially place the electric drive subsystem 72 in the power assist mode, as described below. In still other embodiments in which the intelligent hybrid powertrain system 12 assists in maintaining the engine shaft speed within an optimized isochronous range having a minimum threshold and a maximum threshold value, the controller architecture 16 may advance to STEP 112 to potentially place the electric drive subsystem 72 in the power assist mode to increase the engine shaft speed when decreasing below the minimum threshold value.

During STEP 118 of the hybrid power management process 106, the controller architecture 16 further determines whether a maximum optimal SoC threshold has been reached. In embodiments, the maximum SoC threshold may be a static value representing a maximum optimal SoC threshold below which the SoC of the rechargeable battery supply 88 is desirably maintained to ensure optimal operation of the electric drive system 72. If determining that the current SoC of the rechargeable battery supply 88 is below the maximum optimal SoC threshold during STEP 118, the controller architecture 16 progresses to STEP 120 and commences or continues rapid charging of the rechargeable battery supply 88 utilizing the electrical power generated by back-driving of the motor/generator 82 via the engine 74. Otherwise, the controller architecture 16 continues to STEP 122 in embodiments in which the electric drive subsystem 72 is equipped with an energy dissipation mechanism, such as the energy dissipation mechanism 104 generically shown in FIG. 2 (or another mechanism for permitting motor/generator braking of the engine output shaft 94, while preventing or minimizing charging of the rechargeable battery supply 88). At STEP 122, the controller architecture 16 activates the energy dissipation mechanism 104 to allow the motor/generator 82 to slow the rotational speed of the engine output shaft 94 to, for example, help maintain the shaft output speed within a desired range, as previously described; while preventing, or at least significantly reducing, charging of the rechargeable battery supply 88. In other embodiments, STEP 122 may be omitted from the hybrid power management process 106. Following STEP 120 or STEP 122, the controller architecture advances to STEP 124, as described below.

Figure 6:
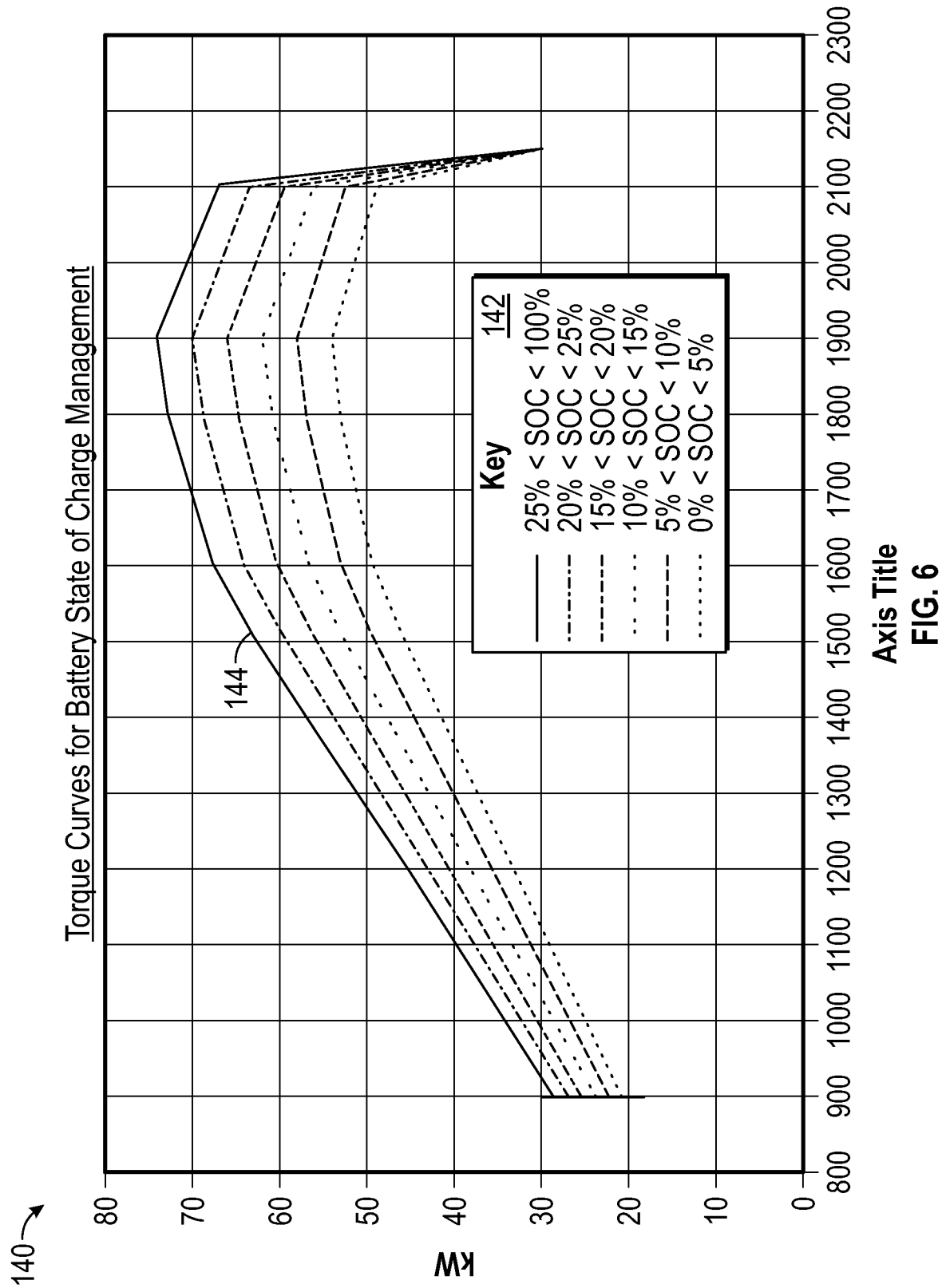
FIG. 6 is a graph plotting a plurality of torque curves, each corresponding to a different state of charge (SoC) range of the rechargeable battery supply and potentially utilized by the controller architecture in controlling the power output of the motor/generator when the electric drive subsystem operates in a power assist mode.

If determining, during STEP 116 of the example process 106, that the electric drive subsystem 72 is not appropriately placed in the rapid charge mode (or a non-charging motor/generator braking mode), the controller architecture 16 returns (or maintains) the electric drive subsystem 72 in a quiescent or standby mode (STEP 121). Following this, the controller architecture 16 of intelligent hybrid powertrain system 12 continues to STEP 124 of the hybrid power management process 106 (FIG. 6). During STEP 124, the controller architecture 16 determines whether termination of the hybrid power management process 106 is warranted; e.g., due to operator input requesting termination of the example process 106, due to shutdown of the combine harvester 10, or due to other events indicating that the combine harvester 10 will cease active harvesting for a prolonged period of time. If determining that the hybrid power management process 106 should terminate, the controller architecture 16 progresses to STEP 126 and terminates the current iteration of the hybrid power management process 106 accordingly. Otherwise, the controller architecture 16 returns to the STEP 110 and the above-described process steps of the hybrid power management process 106 repeat.

As noted above, embodiments of the intelligent hybrid powertrain system 12 advantageously place the electric drive subsystem 72 in the power assist mode when the combine harvester 10 engages in active harvesting, while temporarily transitioning the electric drive subsystem 72 into the rapid charge mode when the combine harvester 10 engages in lower power (e.g., static) unloading of grain from the grain tank 54. In this case, the controller architecture 16 may control the rate of battery discharge to drive the motor/generator 82 and supplement the power output of the engine 74 in a manner ensuring that power assistance is provided through the harvesting phase of the hybrid combine power management cycle. Further, during lower power (e.g., static) unloading of the bulk grain from the combine harvester 10, and perhaps during other periodic lulls in engine loading (e.g., during non-harvesting end turning of the combine harvester 10 between active harvesting passes over a field), the controller architecture 16 switches the electric drive subsystem 72 into the rapid charge mode to exploit the relatively low power output demands of the combine harvester 10 and rapidly recharge the rechargeable battery supply 88 to a level sufficient to repeat the above-described process, as described below in connection with FIGS. 4 and 5.

The above-described hybrid power management scheme may be appreciated more fully by referring to graphs 128 and 130 appearing in FIGS. 4 and 5, respectively. Addressing first the hybrid duty cycle graph 128 shown in FIG. 4, time is plotted along the horizontal axis (abscissa), while power (in kilowatts) is plotted along vertical axis (ordinate). Three example characteristics or traces are shown: a first trace 132 plotting vehicle load, a second trace 134 plotting electric load, and a third trace 136 plotting engine power output of the engine 74 of the combine harvester 10. Comparatively, the time-dependent battery charge graph 130 shown in FIG. 5 likewise plots time along the horizontal axis (abscissa) for a synchronized time period extending from a start time (t0) to an end time 1200 seconds later. Battery charge or discharge (in Kw per hour) is plotted along vertical axis, with a single trace 138 representing the current SoC of the rechargeable battery supply 88 over the plotted time period. At time t0, the vehicle load (trace 132) decreases due to static unloading of the combine harvester 10. For purposes of the present example, it may be assumed that combine unloading occurs in approximately 120 seconds. In response to start of combine unloading, the controller architecture 16 places the electric drive subsystem 72 in the rapid charge mode. Accordingly, the electric load (trace 136) increases over this time period, while little variance occurs in the engine load (trace 134). The SoC of rechargeable battery supply 88 increases from an initial minimum optimal SoC (corresponding to the zero value of the vertical axis in FIG. 5) to a maximum optimal SoC (corresponding to the 1 value of the vertical axis in FIG. 5) over the combine unload period. The slope of the trace 138 from this time range (t0-t120) is substantially constant and may represent a selected charge rate ($R_{RECHARGE}$)) which is sufficient to return adequate power storage to the rechargeable battery supply 88 for discharge during the subsequent active harvesting period, as described below.

Next, a tank fill phase occurs from time period t120-t900. During this time period, the combine harvester 10 conducts two active harvesting passes (occurring over time period t120-t500 and time period time t520-t900) and a non-harvesting end turn between the active harvesting passes (occurring during time period t500-t520). The vehicle load (trace 132) thus increases during the active harvesting passes (t120-t500 and t520-t900), as indicated by trace 132 in FIG. 4; however, the engine output of the engine 74 is maintained in a substantially constant band (generally between 50 and 55 kW in the present example), as indicated by trace 134. This is due to the placement of the electric drive subsystem 72 in the power assist mode during each of these time periods, as indicated by the traces 136, 138 shown in FIGS. 4 and 5, respectively. With reference to the trace 138 in FIG. 5, in particular, the electric drive subsystem 72 is able to provide such power assistance sufficient to maintain the engine output in a substantially constant power output range, while slowly discharging the rechargeable battery supply 88 at a controlled discharge rate ($R_{DISCHARGE}$) In this example, the controller architecture 16 maintains the discharge rate ($R_{DISCHARGE}$) at a substantially constant value, which (as an absolute value) is less than the rapid recharge rate ($R_{RECHARGE}$); e.g., in an embodiment, the rapid recharge rate ($R_{RECHARGE}$) is greater than and may be at least twice an absolute maximum value of the discharge rate ($R_{DISCHARGE}$).

In the example scenario plotted in FIGS. 4 and 5, the combine harvester 10 is capable of filling the grain tank 54, when initially empty, within the illustrated period of active harvesting (here, a total of 760 seconds). Thus, by controlling the discharge rate ($R_{DISCHARGE}$) in the above-described manner to gradually drawn down the rechargeable battery supply 88 over the active harvesting passes (t120-t500 and t520-t900), and specifically over the period of time generally required for the combine harvester 10 to fill the grain tank 54, the intelligent hybrid powertrain system 12 may ensure that the combine harvester 10 is required to unload the grain tank 54 by the time juncture at which the rechargeable battery supply 88 is depleted (or at least drained to the minimum optical SoC threshold), thereby affording the electric drive subsystem 72 with a new opportunity to again charge the rechargeable battery supply 88 during the subsequent low power (e.g., static) unloading phase. Additionally, as indicated in FIGS. 4 and 5 over time period t500-t520, opportunities in which the vehicle load temporarily decreases (here, due to non-harvesting turning of the combine harvester 10) may be leveraged to further charge the rechargeable battery supply 88. By virtue of such a hybrid charge management scheme, and as indicated by the start of a new hybrid combine power management cycle at time t900 and onward in FIGS. 4 and 5, the intelligent hybrid powertrain system 12 can repeat the above cycle on an essentially indefinite basis to reliable assist the engine 74 during the tank fill phase of the combine harvest cycle phases of combine operation. This not only permits downsizing of the engine 74, but further optimizes engine operation by stabilizing the engine output in a narrow band (trace 134) encompassing or at least near the power output (and speed range) at which the engine 74 operates with the greatest efficiency levels.

In the above-described example, the intelligent hybrid powertrain system 12 is described as discharging the rechargeable battery supply 88 at a substantially constant rate when the electric drive subsystem 72 operates in the power assist mode. While this may be the case in certain instances, the controller architecture 16 of the intelligent hybrid powertrain system 12 may beneficially vary the mechanical power output of the motor/generator 82, and therefore the rate at which the rechargeable battery supply 88 discharges, in further embodiments. Consider, for example, an example graph 140 shown in FIG. 6 and plotting a number of torque curves (identified by different line patterns, as indicated by key 142). The depicted torque curves may be stored in a memory accessible to the controller architecture 16 (e.g., the memory 102 shown in FIG. 2), with each torque curve assigned to a different SoC range of the rechargeable battery supply 88. When operating in the power assist mode, the controller architecture 16 may first determine a current SoC of the rechargeable battery supply 88, and then select a corresponding torque curve for usage in determining a target power output of the motor/generator 82 (plotted along the vertical axis of the graph 140) for a given rotational speed rate of the engine output shaft 94

(plotted along the horizontal axis of the graph 140), as monitored utilizing the rotational rate sensor 98.

As shown in FIG. 6, the upper most torque curve 144 may correspond to a relatively large SoC range (here, from 25% to 100% of the optimal SoC range) of the rechargeable battery supply 88; and, thus, represent the torque curve preferably followed during combine harvester operation. The remaining torque curves beneath the uppermost torque curve 144 provide gradually decrease (in a stepwise manner) motor/generator output levels to converse the energy stores within the rechargeable battery supply 88 as the current SoC decreases below a lower threshold (here, below 25%), while still retaining the shape of the torque curve familiar to operators. In this manner, the controller architecture 16 can actively switch between the illustrated torque curves in conjunction with changes in the current SoC of the rechargeable battery supply 88 to more effectively conserver or management the energy stored within the rechargeable battery supply 88, while better maintaining the performance parameters of the combine harvester 10 in accordance with operator expectations.

Figure 7:
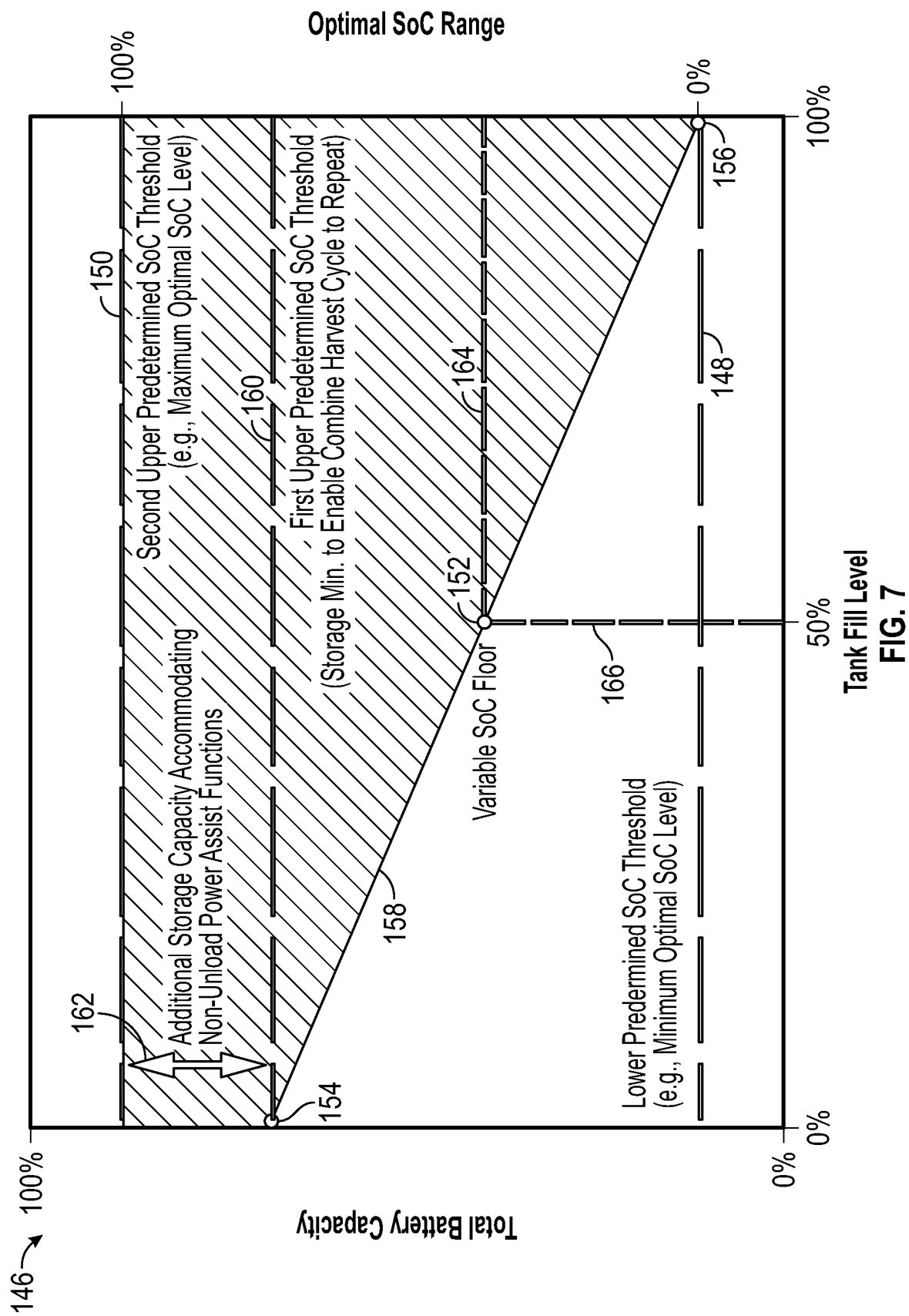
FIG. 7 is a graph plotting an example manner in which a dynamic SoC floor for constraining discharge of the rechargeable battery supply may be established and actively adjusted by the controller architecture in response to variations in the tank fill level of the combine harvester.

As discussed above in connection with FIG. 3, embodiments of the intelligent hybrid powertrain system 12 may further perform processes to generally maintain the SoC of the rechargeable battery supply 88 within an optimal range. Referring next to FIG. 7, an example such an optimal SoC range is plotted along the right vertical axis of a graph 146 and ranges from a minimum optimal SoC threshold (corresponding to a value of 0%, as marked by dashed line 148) and a maximum optimal SoC threshold (corresponding to a value of 100%, as marked by dashed line 150). As may be appreciated by comparing the optimal SoC range plotted along the right vertical axis of the graph 146 to the total battery capacity plotted along the left vertical axis of the graph 146, the optimal SoC range will typically be appreciably less than the total battery capacity of the rechargeable battery supply 88. In less complex embodiments, the controller architecture 16 of the intelligent hybrid powertrain system 12 may monitor a current SoC of the rechargeable battery supply 88 during operation, and perform either or both of the following actions: (i) deter (prevent or significantly reduce) further charging of the rechargeable battery supply 88 when the current SoC reaches the maximum optimal SoC threshold (line 150), and (ii) deter further discharge of the rechargeable battery supply 88 when the current SoC reaches the minimum optimal SoC threshold 148 independently of the current fill level of the grain tank 54. In other instances, the controller architecture 16 may instead deter further discharge of the rechargeable battery supply 88 utilizing a variable or dynamic SoC floor (represented in FIG. 7 by marker 152), as described below.

When provided, the dynamic SoC floor (marker 152) is effectively moved by the controller architecture 16 based upon parameters recalled form the memory 102 and in relation to changes in the current fill level of the grain tank 54. In the illustrated example, the dynamic SoC floor (marker 152) follows a substantially linear path 158 extending from a first point occurring at a tank fill level of 0% (leaving 100% available capacity within the grain tank 54) to a second point occurring at a tank fill level of 100% (leaving 0% available capacity within the grain tank 54). Consequently, at 0% tank fill (100% available capacity of the grain tank 54), the controller architecture 16 effectively moves the variable SoC floor (152) is moved into a position coincident with point 154 and prevents (or at least deters) additional battery discharge when the current SoC of the rechargeable battery supply 88 reaches the level indicated by line 160. This ensures that adequate electrical reserves are maintained in the rechargeable battery supply 88 to complete the harvesting phase of the hybrid combine power management cycle. Thus, in this case, the controller architecture 16 may cease performance (or at least greatly diminish) any non-harvesting power assist functions. Notably, and as indicated in FIG. 7 by double-headed arrow 162, additional storage capacity may be provided within the rechargeable battery supply 88 between the maximum value of the dynamic SoC floor (marker 152) corresponding to line 160 and the maximum optimal SoC threshold (line 150). Thus, the rechargeable battery supply 88 may store and discharge energy within this band to provide the above-described power assist functions associated with non-harvesting actions or events, such as helping better maintain the engine power output in an optimal isochronous range, aiding in load sharing during heavy transient engine loading conditions, and providing a temporary power boost during initial startup of the separator rotor, to list but a few examples.

As noted above, the controller architecture 16 recalls the parameters from the variable SoC floor 152 from memory 102, actively adjusts the position of the variable SoC floor 152 based upon a current available tank fill level, and regulates discharge of the rechargeable battery supply 88 to deter (prevent or significantly reduce) battery discharge when the current SoC of the rechargeable battery supply 88 reaches (or nears) the SoC floor 152. For example, in a scenario in which the grain tank 54 of the combine harvester 10 is half full (represented by a vertical line 164 in FIG. 7), the controller architecture 16 would deter further battery discharge when the current SoC of the rechargeable battery supply 88 reaches the present position of the SoC floor (marker 152), as indicated by a horizontal line 166 in FIG. 7). In this manner, it can be generally ensured that sufficient energy storage will be conserved within the rechargeable battery supply 88 to finish the current tank fill phase and complete filling of the grain tank 54. Finally, as indicated on the lower right of the graph 146, the variable SoC floor 152 may terminate at or slightly above the minimum optimal SoC threshold (line 148) of the rechargeable battery supply 88 as complete drainage of the rechargeable battery supply 88 is permitted within the optimal SoC range when the grain tank 54 is at a fill level of 100% (0% available tank capacity), given that active harvesting cannot continue until unloading of the bulk grain collected within the grain tank 54, placement of the electrical dive subsystem 72 in the rapid charge mode, and corresponding battery recharge to a level sufficient to repeat the above-described process, if not to the maximal optimal SoC of rechargeable battery supply 88 (line 150).

Figure 8:
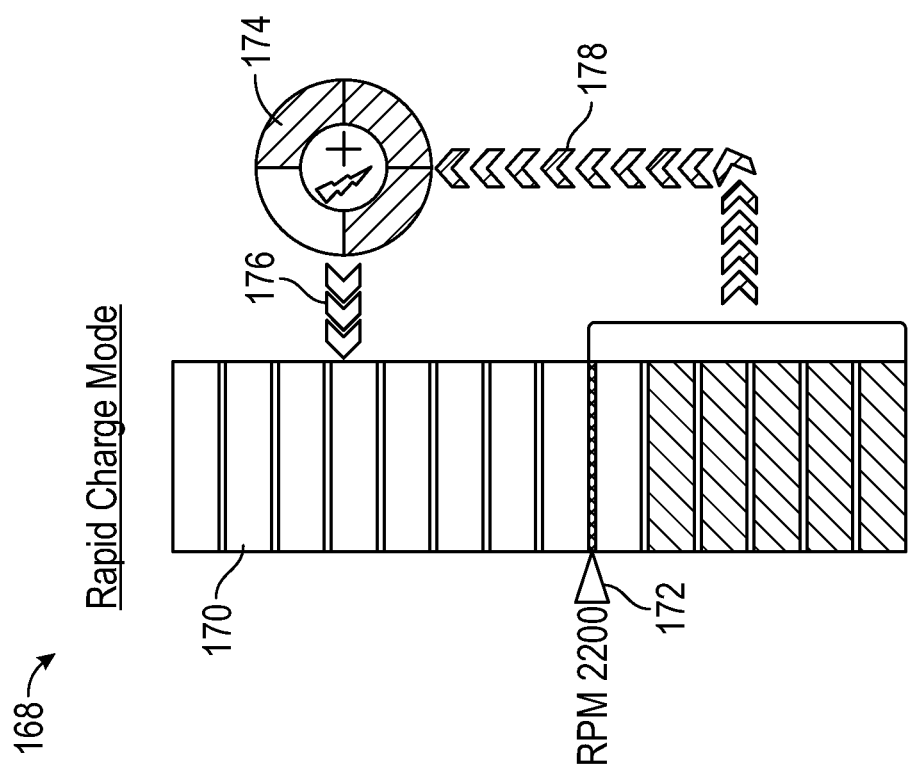
FIGS. 8 and 9 are examples of graphics suitably generated on a display device located in the cabin of the combine harvester to visually express different parameters pertaining to the intelligent hybrid powertrain system.
Figure 9:
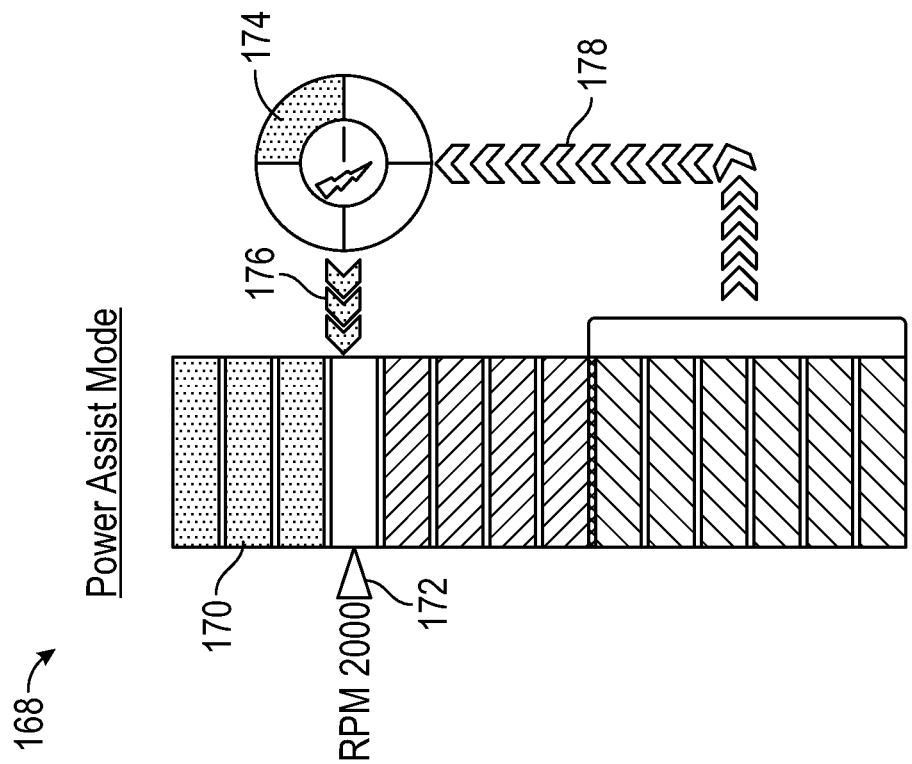

Embodiments of the intelligent hybrid powertrain system 12 may further generate various graphic user interface (GUI) screens or pages on the display device 24 located in the cabin 22 of the combine harvester 10. Such GUI screens may include graphics (textual readouts, symbology, virtual gauges, and the like) provide an operator of the combine harvester 10 with visual awareness of the operational parameters or status of the intelligent hybrid powertrain system 12. Consider, in this regard, the example hybrid powertrain status graphic 168 shown in FIGS. 8 and 9, which may be generated on the display device 24 by the intelligent hybrid powertrain system 12 in embodiments to enable an operator to discern the current SoC of the rechargeable battery supply 88 and the instantaneous engine power level. To this end, the hybrid powertrain status graphic 168 includes: a virtual meter 170 indicating the current power output of the engine 74; a sliding marker 172, which moves vertically alongside the virtual meter 170 to generally indicate (e.g., along with a numerical readout) a current rotational speed of the engine output shaft 94; and a SoC graphic 174, which is divided into quadrants that may be filled or otherwise visually distinguished to indicate when the current SoC of the rechargeable battery supply 88 ranges from 0-25%, 25-50%, 50-75%, or 75-100% of the optimal SoC range. As indicated in FIGS. 7 and 8 by cross-hatching, color coding may be applied to fill certain cells or areas of the hybrid powertrain status graphic 168 with visually striking colors (e.g., red or yellow) when, for example, the engine power output is relatively high or the current SoC of the rechargeable battery supply 88 is relatively low. Finally, arrow pathway graphics 176, 178 provide an intuitive visual indication conveying whether the electric drive subsystem 72 is presently placed in the rapid charge mode, as indicated in FIG. 8 by visual filling of the lower arrow pathway graphic 176 indicating power flow from the engine 74 to the rechargeable battery supply 88; or the electric drive subsystem 72 is presently operates in the power assist mode, as indicated by filling of the upper arrow pathway graphic 178 indicating power flow from the electric drive subsystem to the engine 74.

Enumerated Examples of the Intelligent Hybrid Powertrain System

The following examples of the intelligent hybrid powertrain system are further provided and numbered for ease of reference.

1. In a first example embodiment, an intelligent hybrid powertrain system includes an engine configured to generate an engine power output utilized to power propulsion and grain tank unloading functions of the combine harvester, a controller architecture, and an electric drive subsystem. The electric drive subsystem includes, in turn, a battery supply and a motor/generator, which is configured to be selectively powered by the battery supply to supplement the engine power output or powered by the engine to charge the battery supply. Coupled to battery supply and the engine, the controller architecture is configured to: (i) monitor a current state of charge (SoC) of the battery supply when the combine harvester engages in a combine harvest cycle having a tank fill phase and a tank unload phase; (ii) during the tank fill phase, operate the motor/generator to supplement the engine power output and regulate a rate of battery discharge to prevent the current SoC of the battery supply from decreasing below a lower predetermined SoC threshold prior to completion of the tank fill phase; and (iii) during the tank unload phase, operate the motor/generator to charge the battery supply until the current SoC of the battery supply is equal to or greater than a first upper predetermined SoC threshold enabling the combine harvest cycle to repeat.

2. The intelligent hybrid powertrain system of example 1, wherein the controller architecture is further configured to operate the motor/generator to charge the battery supply when the combine harvester is engaged in non-harvesting turning between harvesting passes as the combine harvester travels over a crop field.

3. The intelligent hybrid powertrain system of example 1, wherein the controller architecture is further configured to operate the motor/generator to charge the battery supply when detecting light transient loading conditions during which the engine is placed under a decreased load less than a lower engine load threshold.

4. The intelligent hybrid powertrain system of example 1, wherein the controller architecture is configured to operate the motor/generator to supplement the engine power output when detecting light transient loading conditions during which the engine is placed under a decreased load greater than a lower engine load threshold, while limiting battery discharge to ensure an adequate stored energy reserve to complete a current tank unload phase of the combine harvest cycle.

5. The intelligent hybrid powertrain system of example 1, wherein the combine harvester includes a separator rotor. The controller architecture is configured to operate the motor/generator to supplement the engine power output during rotational startup of the separator rotor, while limiting battery discharge to ensure an adequate stored energy reserve to complete a current tank unload phase of the combine harvest cycle.

6. The intelligent hybrid powertrain system of example 1, further including a memory storing a plurality of torque curves, each associated with a different SoC range of the battery supply. The controller architecture is coupled to memory and is configured to: (i) select a torque curve from the plurality of torque curves corresponding to the current SoC of the rechargeable battery supply; and (ii) control the motor/generator such that a cumulative power output of the motor/generator and the engine substantially follows the selected torque curve during the tank fill phase of the combine harvest cycle.

7. The intelligent hybrid powertrain system of example 1, further including a rotational rate sensor configured to provide data indicative of an engine shaft speed of the engine. The controller architecture is coupled to the rotational rate sensor and is further configured to: (i) operate the motor/generator to slow the engine shaft speed if exceeding an upper speed threshold during the combine harvest cycle; and (ii) operate the motor/generator to accelerate the engine shaft speed if falling below a lower speed threshold during the combine harvest cycle.

8. The intelligent hybrid powertrain system of example 7, wherein, when operating the motor/generator to slow the engine shaft speed, the controller architecture is further configured to deter charging of the battery supply in conjunction with back-driving of the motor/generator when the current SoC of the battery supply reaches a second upper predetermined upper threshold greater than the first upper predetermined upper threshold.

9. The intelligent hybrid powertrain system of example 1, wherein controller architecture is further configured to deter charging of the battery supply during the tank unload phase when the current SoC of the battery supply reaches second upper predetermined threshold greater than the first upper predetermined SoC threshold.

10. The intelligent hybrid powertrain system of example 9, further including an energy dissipation mechanism electrically coupled between the motor/generator and the battery supply. The controller architecture is configured to activate the energy dissipation mechanism to deter charging of the battery supply during the tank unload phase when the current SoC of the battery supply reaches a second predetermined upper threshold 11. The intelligent hybrid powertrain system of example 1, wherein, during the tank unload phase, the controller architecture is configured to operate the motor/generator to charge the battery supply at a rate of recharge having an absolute value greater than a maximum value of the rate of battery discharge during the tank fill phase.

12. The intelligent hybrid powertrain system of example 1, further including a memory storing a dynamic SoC floor, as well as onboard sensors integrated into the combine harvester and configured to provide data indicative of a fill level of the grain tank. Coupled to the memory and to the onboard sensors, the controller architecture is further configured to: (i) adjust a positioning of the dynamic SoC floor based upon the fill level of the grain tank, as indicated by the onboard sensors of the combine harvest cycle; and (ii) deter further discharge of the battery supply when the current SoC of the rechargeable battery supply reaches dynamic SoC floor during the tank fill phase of the combine harvest cycle.

13. The intelligent hybrid powertrain system of example 1, wherein the controller architecture is configured to operate the motor/generator to charge the battery supply during the tank unload phase, while a ground speed of the combine harvester is less than one mile per hour.

14. In a further example embodiment, the intelligent hybrid powertrain system includes an engine configured to generate an engine power output utilized to power propulsion and grain tank unloading functions of the combine harvester, onboard sensors configured to provide data indicative of a fill level of the grain tank, and an electric drive subsystem having a battery supply and a motor/generator powered by the battery supply to supplement the engine power output or powered by the engine to charge the battery supply. A controller architecture is coupled to the onboard sensors and to the electric drive subsystem. The controller architecture is configured to: (i) monitor a current state of charge (SoC) of the battery supply when the combine harvester engages in a combine harvest cycle having a tank fill phase and a tank unload phase; (ii) during the tank fill phase, operate the motor/generator to supplement the engine power output and regulate a rate of discharge of the battery supply to maintain the current SoC at or above a dynamic SoC floor having a value varying in conjunction with a current fill level of the grain tank; and (iii) during the tank unload phase, operate the motor/generator to charge the battery supply.

15. The intelligent hybrid powertrain system of example 14, wherein the combine harvester includes a separator rotor. The controller architecture is configured to operate the motor/generator to supplement the engine power output during rotational startup of the separator rotor, while limiting battery discharge to maintain the current SoC at or above a dynamic SoC floor.

Conclusion

There has thus been provided embodiments of intelligent hybrid powertrain system for usage onboard combine harvesters. Embodiments of the intelligent hybrid powertrain system strategically determine when to place an electric drive system in a power assist mode or rapid charge mode to optimize various aspects of combine harvester performance, while enabling internal combustion engine downsizing to provide enhancements in fuel economy, lowered emissions, cost savings, and other benefits. Power limitation concerns are addressed through the strategic application of the power assist mode during the tank fill phase of the combine harvest cycle; and, specifically, by discharging the rechargeable battery supply at a controlled rate (variable or non-variable) to drive the motor/generator and supplement the power output of the engine during this phase of operation. In embodiments, the rate at which the rechargeable battery supply discharges is controlled to ensure adequate power supply through the entire duration each grain tank filling phase. Subsequently, during lower power (e.g., low speed or static) unloading of the bulk grain from the combine harvester, the controller architecture switches the electric drive subsystem into the rapid charge mode to exploit the relatively low power output demands of the combine harvester and rapidly recharge the rechargeable battery supply to a level sufficient to repeat the above-described process. Generally, then, embodiments of the hybrid powertrain system intelligent switch between battery charge and discharge to enable energy storage during light load conditions, with the stored energy then utilized to assist in carrying-out each harvest cycle within the battery storage energy and durability limits. Various other benefits are also achieved by embodiments of the intelligent hybrid powertrain system, as described above.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An intelligent hybrid powertrain system utilized onboard a combine harvester having a grain tank, the intelligent hybrid powertrain system comprising:
    an engine configured to generate an engine power output utilized to power propulsion and grain tank unloading functions of the combine harvester;
    an electric drive subsystem, comprising:
        a battery supply; and
        a motor/generator powered by the battery supply to supplement the engine power output or powered by the engine to charge the battery supply; and
    a controller architecture coupled to the electric drive subsystem, the controller architecture configured to:
        monitor a current state of charge (SoC) of the battery supply when the combine harvester engages in a combine harvest cycle having a tank fill phase and a tank unload phase;
        during the tank fill phase, operate the motor/generator to supplement the engine power output and regulate a rate of battery discharge to prevent the current SoC of the battery supply from decreasing below a lower predetermined SoC threshold prior to completion of the tank fill phase; and
        during the tank unload phase, operate the motor/generator to charge the battery supply until the current SoC of the battery supply is equal to or greater than a first upper predetermined SoC threshold enabling the combine harvest cycle to repeat.

2. The intelligent hybrid powertrain system of claim 1, wherein the controller architecture is further configured to operate the motor/generator to charge the battery supply when the combine harvester is engaged in non-harvesting turning between harvesting passes as the combine harvester travels over a crop field.

3. The intelligent hybrid powertrain system of claim 1, wherein the controller architecture is further configured to operate the motor/generator to charge the battery supply when detecting light transient loading conditions during which the engine is placed under a decreased load less than a lower engine load threshold.

4. The intelligent hybrid powertrain system of claim 1, wherein the controller architecture is configured to operate the motor/generator to supplement the engine power output when detecting light transient loading conditions during which the engine is placed under a decreased load greater than a lower engine load threshold, while limiting battery discharge to ensure an adequate stored energy reserve to complete a current tank unload phase of the combine harvest cycle.

5. The intelligent hybrid powertrain system of claim 1, wherein the combine harvester comprises a separator rotor; and
wherein the controller architecture is configured to operate the motor/generator to supplement the engine power output during rotational startup of the separator rotor, while limiting battery discharge to ensure an adequate stored energy reserve to complete a current tank unload phase of the combine harvest cycle.

6. The intelligent hybrid powertrain system of claim 1, further comprising a memory storing a plurality of torque curves, each associated with a different SoC range of the battery supply; and
wherein the controller architecture is coupled to memory and is configured to:
select a torque curve from the plurality of torque curves corresponding to the current SoC of the battery supply; and
control the motor/generator such that a cumulative power output of the motor/generator and the engine substantially follows the selected torque curve during the tank fill phase of the combine harvest cycle.

7. The intelligent hybrid powertrain system of claim 1, further comprising a rotational rate sensor configured to provide data indicative of an engine shaft speed of the engine;
wherein the controller architecture is coupled to the rotational rate sensor and is further configured to:
operate the motor/generator to slow the engine shaft speed if exceeding an upper speed threshold during the combine harvest cycle; and
operate the motor/generator to accelerate the engine shaft speed if decreasing below a lower speed threshold during the combine harvest cycle.

8. The intelligent hybrid powertrain system of claim 7, wherein, when operating the motor/generator to slow the engine shaft speed, the controller architecture is further configured to deter charging of the battery supply in conjunction with back-driving of the motor/generator when the current SoC of the battery supply reaches a second upper predetermined upper threshold greater than first upper predetermined SoC threshold.

9. The intelligent hybrid powertrain system of claim 1, wherein controller architecture is further configured to deter charging of the battery supply during the tank unload phase when the current SoC of the battery supply reaches a second upper predetermined threshold greater than the first upper predetermined SoC threshold.

10. The intelligent hybrid powertrain system of claim 9, further comprising an energy dissipation mechanism electrically coupled between the motor/generator and the battery supply; and
wherein the controller architecture is configured to activate the energy dissipation mechanism to deter charging of the battery supply during the tank unload phase when the current SoC of the battery supply reaches a second predetermined upper threshold.

11. The intelligent hybrid powertrain system of claim 1, wherein, during the tank unload phase, the controller architecture is configured to operate the motor/generator to charge the battery supply at a rate of recharge having an absolute value greater than a maximum value of the rate of battery discharge during the tank fill phase.

12. The intelligent hybrid powertrain system of claim 1, further comprising:
a memory storing a dynamic SoC floor; and
onboard sensors integrated into the combine harvester and configured to provide data indicative of a fill level of the grain tank;
wherein the controller architecture is coupled to the memory and to the onboard sensors, the controller architecture configured to:
adjust a positioning of the dynamic SoC floor based upon the fill level of the grain tank, as indicated by the onboard sensors of the combine harvest cycle; and
deter further discharge of the battery supply when the current SoC of the battery supply reaches dynamic SoC floor during the tank fill phase of the combine harvest cycle.

13. The intelligent hybrid powertrain system of claim 1, wherein the controller architecture is configured to operate the motor/generator to charge the battery supply during the tank unload phase, while a ground speed of the combine harvester is less than one mile per hour.

14. An intelligent hybrid powertrain system utilized onboard a combine harvester having a grain tank, the intelligent hybrid powertrain system comprising:
an engine configured to generate an engine power output utilized to power propulsion and grain tank unloading functions of the combine harvester;
onboard sensors configured to provide data indicative of a fill level of the grain tank; and
an electric drive subsystem, comprising:
a battery supply; and
a motor/generator powered by the battery supply to supplement the engine power output or powered by the engine to charge the battery supply; and
a controller architecture coupled to the onboard sensors and to the electric drive subsystem, the controller architecture configured to:
monitor a current state of charge (SoC) of the battery supply when the combine harvester engages in a combine harvest cycle having a tank fill phase and a tank unload phase;
during the tank fill phase, operate the motor/generator to supplement the engine power output and regulate a rate of discharge of the battery supply to maintain the current SoC at or above a dynamic SoC floor having a value varying in conjunction with a current fill level of the grain tank; and
during the tank unload phase, operate the motor/generator to charge the battery supply.

15. The intelligent hybrid powertrain system of claim 14, wherein the combine harvester comprises a separator rotor; and wherein the controller architecture is configured to operate the motor/generator to supplement the engine power output during rotational startup of the separator rotor, while limiting battery discharge to maintain the current SoC at or above a dynamic SoC floor.

16. The intelligent hybrid powertrain system of claim 14, wherein the controller architecture is configured to operate the motor/generator to supplement the engine power output when detecting light transient loading conditions during which the engine is placed under a decreased load greater than a lower engine load threshold, while limiting battery discharge to maintain the current SoC at or above a dynamic SoC floor.

17. The intelligent hybrid powertrain system of claim 14, further comprising a rotational rate sensor configured to provide data indicative of an engine shaft speed of the engine;

wherein the controller architecture is further configured to operate the motor/generator to accelerate the engine shaft speed if decreasing below a lower speed threshold during the combine harvest cycle, while limiting battery discharge to maintain the current SoC at or above a dynamic SoC floor.

18. The intelligent hybrid powertrain system of claim 17, wherein the controller architecture is further configured to operate the motor/generator to accelerate the engine shaft speed if decreasing below a lower speed threshold during the combine harvest cycle.

19. The intelligent hybrid powertrain system of claim 14, further comprising a memory storing a plurality of torque curves, each associated with a different SoC range of the battery supply; and wherein the controller architecture is coupled to memory and is configured to:
select a torque curve from the plurality of torque curves corresponding to the current SoC of the battery supply; and
control the motor/generator such that a cumulative power output of the motor/generator and the engine substantially follows the selected torque curve during the tank fill phase of the combine harvest cycle.

20. The intelligent hybrid powertrain system of claim 14, wherein the controller architecture is configured to operate the motor/generator to charge the battery supply during the tank unload phase, while a ground speed of the combine harvester is zero.

\* \* \* \* \*